(12) United States Patent
Van Antwerpen et al.

(10) Patent No.: US 10,868,679 B1
(45) Date of Patent: Dec. 15, 2020

(54) NONVOLATILE MEMORY DEVICE WITH REGIONS HAVING SEPARATELY PROGRAMMABLE SECURE ACCESS FEATURES AND RELATED METHODS AND SYSTEMS

(71) Applicant: Cypress Semiconductor Corporation, San Jose, CA (US)

(72) Inventors: Hans Van Antwerpen, Mountain View, CA (US); Cliff Zitlaw, San Jose, CA (US); Stephan Rosner, Campbell, CA (US); Yoav Yogev, Mazkeret Batya (IL); Sandeep Krishnegowda, Santa Clara, CA (US); Steven Wilson, Fremont, CA (US)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 0 days.

(21) Appl. No.: 16/827,478

(22) Filed: Mar. 23, 2020

Related U.S. Application Data

(60) Provisional application No. 62/878,404, filed on Jul. 25, 2019.

(51) Int. Cl.
*H04L 9/32* (2006.01)
*G06F 3/06* (2006.01)
*G06F 21/60* (2013.01)

(52) U.S. Cl.
CPC .......... *H04L 9/3273* (2013.01); *G06F 3/0622* (2013.01); *G06F 3/0637* (2013.01); *G06F 3/0679* (2013.01); *G06F 21/602* (2013.01); *H04L 9/3242* (2013.01)

(58) Field of Classification Search
CPC ... H04L 9/3273; H04L 9/3242; G06F 3/0622; G06F 3/0637; G06F 3/0679; G06F 21/602
USPC ........................................................ 713/193
See application file for complete search history.

(56) References Cited

U.S. PATENT DOCUMENTS

| | | | | |
|---|---|---|---|---|
| 7,124,170 | B1 * | 10/2006 | Sibert ................... | G06F 12/145 709/216 |
| 8,566,940 | B1 * | 10/2013 | Rudelic ............... | G06F 12/1425 711/100 |
| 10,560,263 | B2 * | 2/2020 | Dover ..................... | G06F 21/78 |
| 2005/0106548 | A1 | 5/2005 | Weiner et al. | |
| 2009/0249014 | A1 * | 10/2009 | Obereiner ........... | G06F 12/1441 711/164 |

(Continued)

OTHER PUBLICATIONS

International Search Report for International Application No. PCT/US20/043361 dated Sep. 29, 2020; 3 pages.

(Continued)

*Primary Examiner* — Michael S McNally

(57) ABSTRACT

A device can include a plurality of regions, each region including a plurality of nonvolatile memory cells: a permission store configured to store a set of permission values, including at least one permission value for each region in a nonvolatile fashion; and access control circuits configured to control access to each region according to the permission value for the region, including one or more of requiring authentication to access the region, encrypting data read from the region, and decrypting data for storage in the region. Related methods and systems are also disclosed.

19 Claims, 19 Drawing Sheets

(56) References Cited

U.S. PATENT DOCUMENTS

2015/0106548 A1* 4/2015 Dubois ............... G06F 12/0284
                                                      711/103
2018/0373598 A1* 12/2018 Mondello ........... G06F 11/1458

OTHER PUBLICATIONS

Written Opinion of the International Searching Authority for International Application No. PCT/US20/043361 dated Sep. 29, 2020; 4 pages.

* cited by examiner

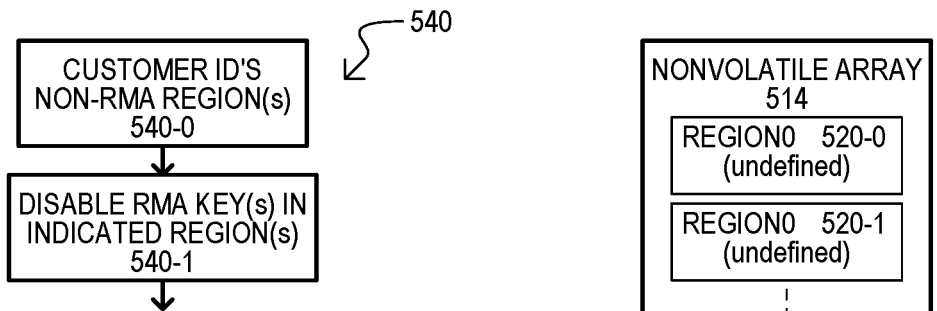
FIG. 5A
FIG. 5B
FIG. 5C
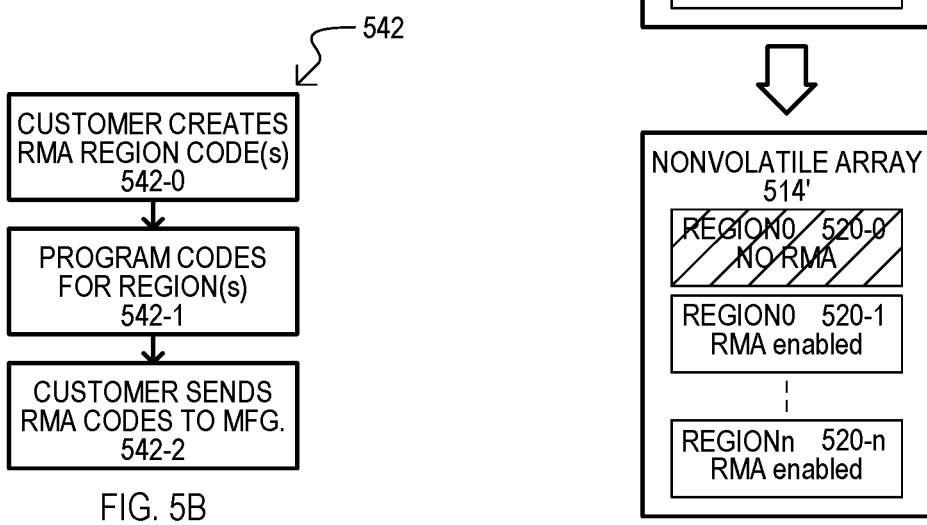
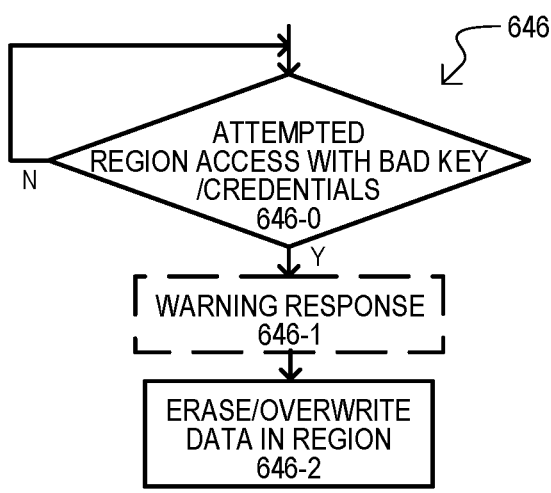
FIG. 6

| REGION_KEY_TYPE | KEY TYPE# | DESCRIPTION | READ/ PROG/ERASE | AUTHENTICATED LOCK/UNLOCK | AUTHENTICATED READ/PROG/ERASE | ENCRYPTED READ/PROG/ERASE |
|---|---|---|---|---|---|---|
| | | | Normal Mode | | Crypto Mode | |
| NONE | 0 | No key, conventional access only, region not active or mapped into user array | Supported | Not Supported | Not Supported | Not Supported |
| SECRET | 1 | Stored, shared secret key, Session key for MAC or Encryption | Supported | Supported | Supported | Supported |

FIG. 8B

| PERMISSION TYPE | ACCESS # | READ | PROG/ERASE | AUTHENTICATED READ/PROG/ERASE | ENCRYPTED READ/PROG/ERASE |
|---|---|---|---|---|---|
| | | Normal Mode | | Crypto Mode | |
| UNRESTRICTED | 0 | Allowed | Allowed | Allowed | Not Allowed |
| READ_ONLY | 1 | Allowed | Not Allowed | Allowed | Not Allowed |
| WRITE_PROTECTED | 2 | Allowed | Must Unlock | Allowed | Not Allowed |
| READ_WRITE_PROTECTED | 3 | Must Unlock | Must Unlock | Allowed | Not Allowed |
| ENCRYPTED_ONLY | 4 | Not Allowed | Not Allowed | Not Allowed | Allowed |

FIG. 8C

| 1284-0 | 1284-1 | 1284-2 | 1284-3 | 1284-4 |
|---|---|---|---|---|
| CMD CODE | ADDRESS | SIZE | DATA | MAC |
| 2 bytes | 4 bytes | 2 bytes | 512 bytes | 64 bytes |
| [1:0] | [5:2] | [7:6] | [size+7:8] | [size+71:size+8] |
| 0004h | ADD | SIZE | DATA | MAC |
| MAC=HMAC(region_session_key / CMD CODE / ADD / DATA / COUNTER) COUNTER included in MAC but not transmitted in packet ||||||

Authenticated Program Request Packet

FIG. 12A

| 1286-0 | 1286-1 | 1286-2 |
|---|---|---|
| RESPONSE | RESULT | MAC |
| 2 bytes | 2 bytes | 64 bytes |
| [1:0] | [3:2] | [67:4] |
| 0400h | RESULT | MAC |
| MAC=HMAC(region_session_key / RESPONSE / RESULT / COUNTER) |||

Authenticated Program Response Packet

FIG. 12B

| CMD Code | Algorithm | Address | Nonce | Data | MAC |
|---|---|---|---|---|---|
| 2 bytes | 2 bytes | 2 bytes | 16 bytes | 0 / 32 bytes | 64 bytes |
| [1:0] | [3:2] | [5:4] | [21:6] | 0 / [53:22] | [85:22] / [117:54] |
| 000Ah | algo | region# | nonce | host_dh_intermediate | mac |
| | 0000h -> HMAC | | | mac = HMAC[region_key, cmd] [algo] [region#] [nonce] [CMD_Counter]<br>region_session_key = HMAC[region_key, cmd, region#] [nonce] [CMD_Counter] | |
| | 0001h -> ECDH P-256<br>0002h -> ECDH 25519 | | | mac = HMAC[region_key, cmd] [algo] [region#] [nonce] [host_dh_int] [CMD_Counter]<br>region_session_key = EDCH[device_dh_initial, host_dh_intermediate] | |

CreateRegionSessionKey Packet (PACKET_WRITE bus transaction)

FIG. 14A

| Response | Result | Data | MAC |
|---|---|---|---|
| 2 bytes | 2 bytes | 0 / 32 bytes | 64 bytes |
| [1:0] | [3:2] | 0 / [35:4] | [67:4] / [99:36] |
| 0A00h | result | device_dh_intermediate | mac | if HMAC: mac = HMAC[region_key, response] [result] [CMD_Counter]
if ECDH: mac = HMAC[region_key, response] [result] [device_dh_intermediate] [CMD_Counter]

Response to CreateRegionSessionKey
(PACKET_READ bus transaction)

FIG. 14B

NONVOLATILE MEMORY DEVICE WITH REGIONS HAVING SEPARATELY PROGRAMMABLE SECURE ACCESS FEATURES AND RELATED METHODS AND SYSTEMS

RELATED APPLICATIONS

This application claims the benefit of U.S. provisional patent application having Ser. No. 62/878,404, filed on Jul. 25, 2019, the contents of which are incorporated by reference herein.

TECHNICAL FIELD

The present disclosure relates generally to nonvolatile memory devices, and more particularly to nonvolatile memory devices having multiple regions that can each have their own user-configured security attributes.

BACKGROUND

Flash memory devices are widely used in electronic systems to store critical data in a nonvolatile manner, such as firmware for execution by an associated processor and/or configuration data for a system. Thus, an important feature for nonvolatile memories the ability to store such values securely. Some NAND flash devices can include a replay protected memory block (RPMB), Such a feature can provide a secure section in a memory device, but only to a limited size region. Thus secure accesses can be limited to one region.

Unlike NAND flash devices, NOR flash devices can provide high granularity accesses (i.e., byte wise access) as well as faster access. Further, most NOR flash devices have execution-in-place (XIP) capabilities, enabling code to be run directly from the memory device rather than having to be loaded into system RAM. For these reasons NOR devices can be preferred as the nonvolatile storage solution for firmware for many systems. However, conventional NOR flash devices provide little or only limited security options.

BRIEF DESCRIPTION OF THE DRAWINGS

FIGS. 5A to 5C are diagrams showing methods for enabling or disabling manufacturer access to regions of a memory device according to embodiments, FIG. 6 is a flow diagram of a method for erasing data in a region of a memory device in response to invalid access attempts according to an embodiment.

FIGS. 8A to 8C are diagrams showing devices and methods for enabling different security access types for different regions of a memory device according to embodiments.

FIGS. 12A and 12B are diagrams showing an authenticated request packet and authenticated response for a memory device according to embodiments.

FIGS. 14A and 14B are diagrams showing the establishment of a session key for secure communications with a memory device and host device according to embodiments.

DETAILED DESCRIPTION

According to embodiments, a nonvolatile memory device can include a number of different regions, each region being separately configurable with different security features. Security features can include, but are not limited to, disabling particular types of accesses to a region (e.g., read, programs or erases), or requiring some or all such accesses to be subject to a security operation. Security operations can include but are not limited to authentication and encryption.

In some embodiments, regions of a nonvolatile memory device can have a NOR configuration.

In some embodiments, a nonvolatile memory device can include one or more nonvolatile monotonic counters configurable by a user to generate one time count values for security operations.

In some embodiments, ephemeral keys can be generated with a deprecator that prevents a key from a pool of keys from being reused.

In some embodiments, nonvolatile indices for each region can be used to access secure keys from a pool of such keys.

In some embodiments, a nonvolatile memory device can authenticate a host device.

Figure 1:
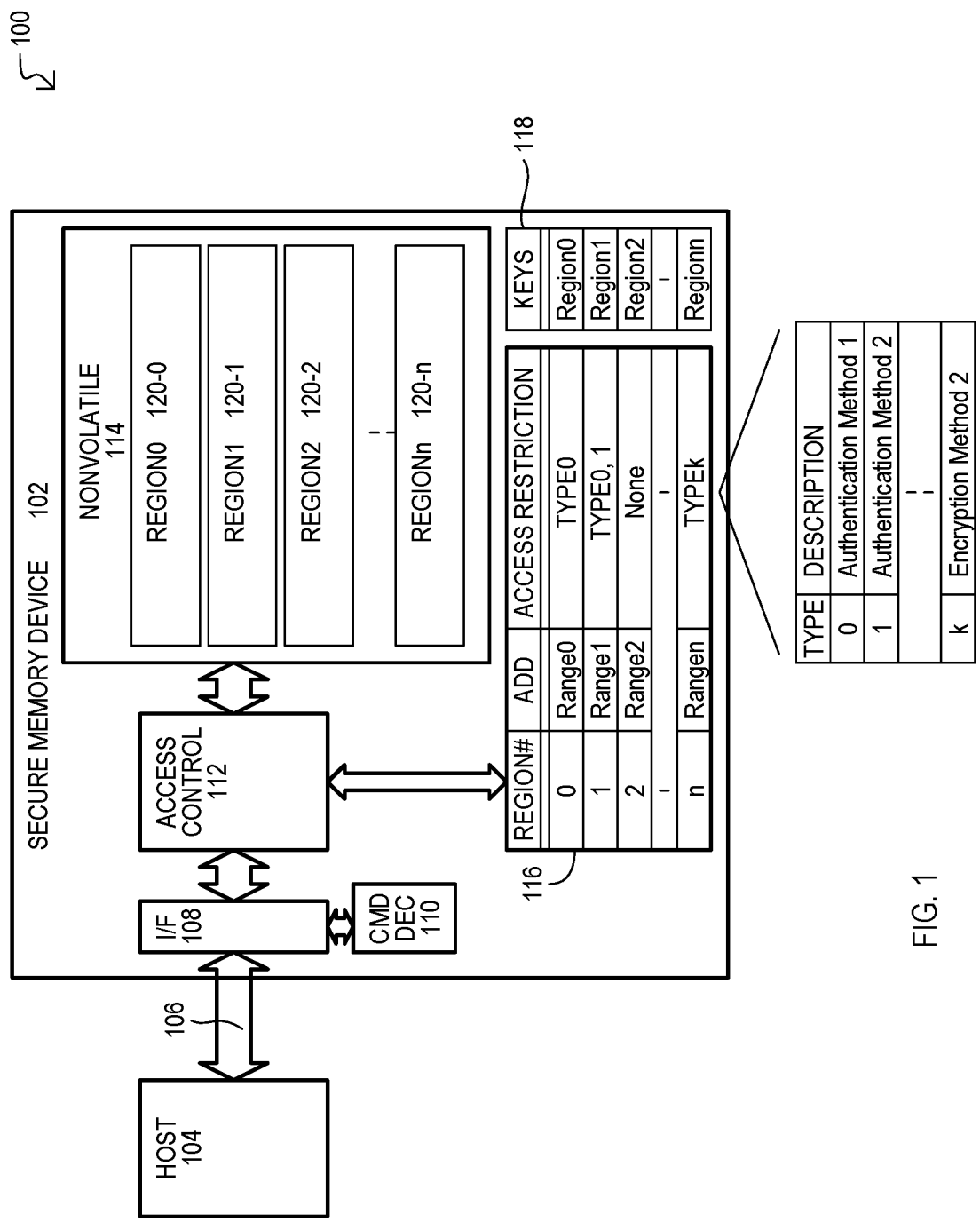
FIG. 1 is a block diagram of a system with a memory device having regions h separately programmable security features according to an embodiment.

In the various embodiments below, like items are referred to by the same reference characters, but with the leading digit(s) corresponding to the figure number, FIG. 1 is a block diagram of a system 100 according to an embodiment, A system 100 can include a memory device 102 in communication with a host device 104 over a communication path 106, A memory device 102 can include an interface (I/F) 108, a command decoder 110, access control circuit 112, nonvolatile memory section 114, region configuration store 116, and key store 110, An interface 108 can enable communication with a host device 104 over communication path 106. An I/F 108 can be any suitable I/F, including but not limited to a parallel I/F, serial I/F or wireless I/F. Communication path 106 can take a form suitable for the I/F 108, In some embodiments, I/F 108 can process communications in packet form.

A command decoder 110 can decode commands received from a host 104. In some embodiments, a command decoder 110 can distinguish read commands, program commands and erase commands. Further, such commands can include, or be accompanied by, region identifier values. Region identifier values can identify particular regions (described in more detail below) located within nonvolatile memory section 114 that is targeted for an operation by the command.

Access control circuit 112 can control access to different regions of nonvolatile memory section 114 according to security features of such region. Access control circuit 114 can execute any suitable security algorithms, including one or multiple authentication methods and/or encryption methods.

Nonvolatile memory section 114 can include one or more arrays of nonvolatile memory cells organized into multiple regions 120-0 to -n, Regions (120-0 to -n) can have predefined limits or be configurable by a user. In some embodiments, regions (120-0 to -n) can be composed of flash memory cells in a NOR configuration. Memory cells can be addressable in relatively small sizes, such as bytes, words or double words.

Region configuration store 116 can store configuration values that can control access to, and in some embodiments, define the extents of, the regions (120-0 to -n) in nonvolatile memory section 114. Region configuration store 116 can include nonvolatile storage circuits which may or may not be part of nonvolatile memory section 114. Values stored within region configuration store 116 can be securely stored, being accessible only with predetermined procedures, including authentication or decryption. In the embodiment shown, access to region configuration store 116 can be controlled by access control circuits 112. In addition, access control circuits 112 can read values from region configuration store 116 to determine whether a region (120-0 to -n) can be accessed or not based on any access restrictions for the region.

While a region configuration store 116 can store any suitable values to establish the security features of a region, in the embodiment shown, region configuration store 116 can store an access restriction value for each region (0 to n). As shown, access restrictions values can define a particular authentication or encryption method. However, such values can also restrict access according to operation type (e.g., read, program, erase). Thus, access restriction values can indicate if a region (120-0 to -n) can or cannot be read, can or cannot be programmed, can or cannot be erased, requires or does not require authentication, requires or does not require encryption/decryption or any combination thereof. As noted above, regions (120-0 to -n) can also be user defined. In the embodiments shown, regions (120-0 to -n) can be defined by range values (Range0 to Rangen) which can correspond to physical addresses for each region (120-0 to -n). Physical addresses can be mapped to logical addresses understood by the host device 104 according to any suitable method.

Figure 2:
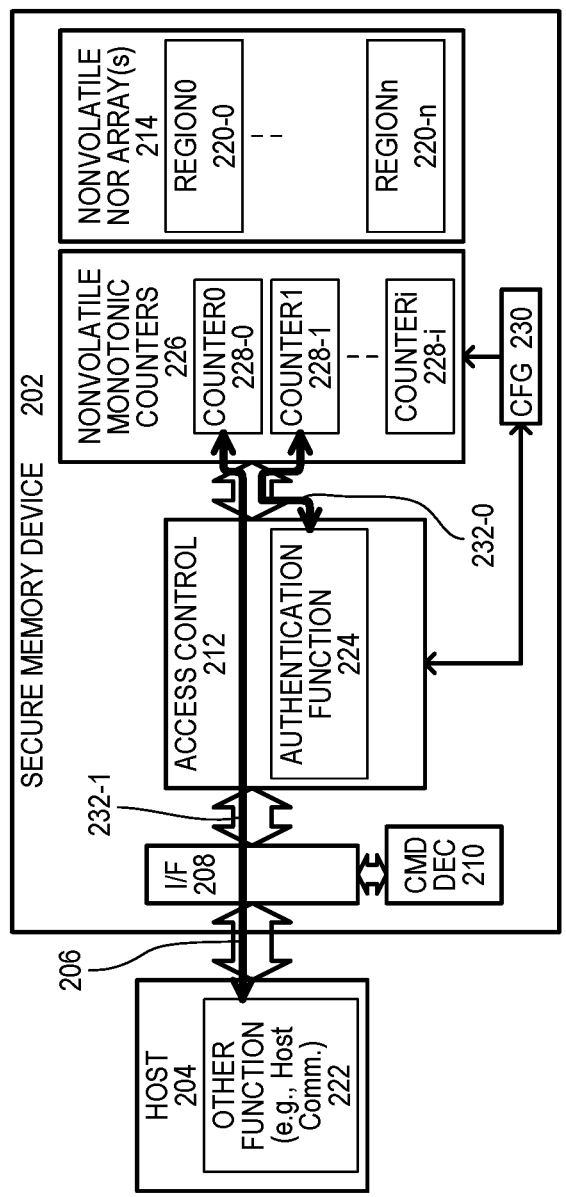
FIG. 2 is a block diagram of a system with a NOR type nonvolatile memory device with multiple programmable nonvolatile monotonic counters according to an embodiment.

A key store 118 can store key values which can be used to control access to regions (120-0 to -n), Key store 118 can include nonvolatile storage circuits which may or may not be part of nonvolatile memory section 114. As in the case of region configuration store 116, key store 118 can store key values securely, being accessible only with predetermined procedures, and in the embodiment shown, is accessible by access control circuits 112. Access control circuits 112 can read key values from key store 118 when determining whether a region (120-0 to -n) can be accessed or not. A key store 118 can store multiple key values for each region (120-0 to -n). In some embodiments, such keys can be one-time, or limited time use keys, to enable the generation of ephemeral session keys for transactions between host device 104 and memory device 102, FIG. 2 is a block diagram of a system 200 according to another embodiment. A system 200 can include a memory device 202, host device 204, communication path 206, as noted for FIG. 1. FIG. 2 differs from FIG. 1 in that a host device 204 can have a function 222 that can use a count value and memory device 222 can include a nonvolatile monotonic counter (NMC) section 226. NMC section 226 can include one or more NMCs (228-0 to -i). Each NMC (228-0 to -i) can generate a nonvolatile, non-repeating or essentially non-repeating count value. An essentially non-repeating count value can be count value that will repeat only after it turns over (exceeds a maximum value to reset to a minimum value). An NMC (228-0 to -i) can generate a different count value each time it is activated. NMCs (228-0 to -i) can be separately configurable according to NMC configuration values 228. Such configuration values can alter any suitable features of an NMC, including but not limited to: count direction (e.g., increment/decrement), count span (e.g., difference between each count), count value size, count value format, starting count value, and which operations trigger the activation of a new count value (e.g., new communication session). NMC configuration values 230 can include nonvolatile storage circuits which may or may not be part of nonvolatile memory section 114.

Count values generated by NMCs (228-0 to -i) can be used for any suitable function, including functions internal to memory device 202 as well as function external to memory device 202. Two of many possible functions for count values are shown in FIG. 2, As a first example, count values from an NMC (228-0 to -i) can be used by an authentication function to prevent replay attacks form, or appearing to be from, the host device 204, The transfer of a count value for such a function is shown as 232-0, Count values can then be securely transmitted to a host device 204 (or other device) and used to generate message authentication codes (MAC) or the like. As a second example, one or more count values from NMCs (228-0 to -i) can be transmitted to host device 204 for use by a function 222 (that is, a function other than preventing replay attacks from the host), The transfer of a count value for such a function is shown as 232-1. Such a transfer 232-1 can include count value being packetized and/or encrypted. A function 222 can be any suitable function, and as but one example, can be used for a host device 222 to communicate with another device (not shown).

Figure 3:
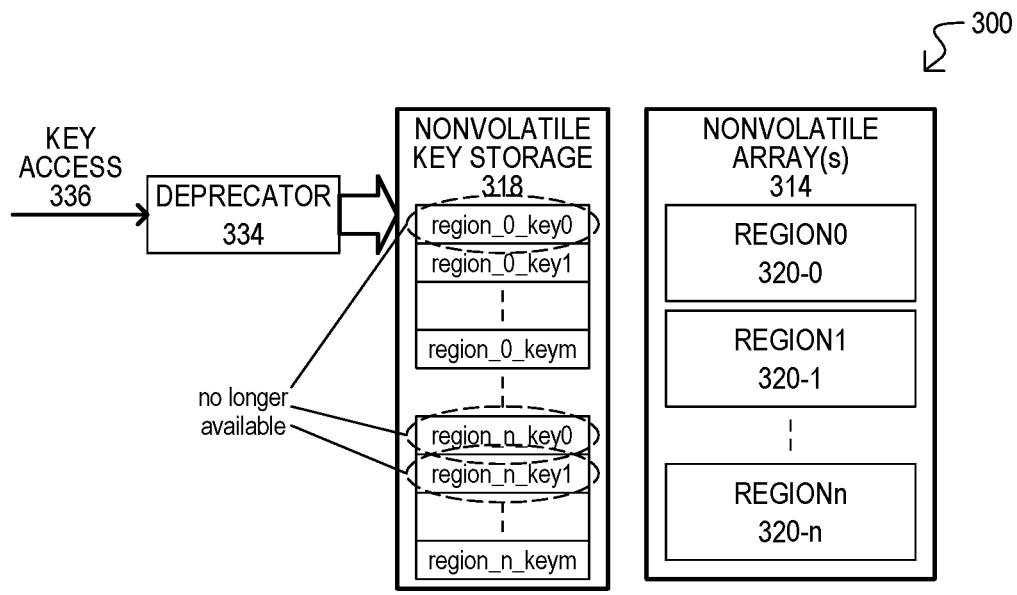
FIG. 3 is a diagram showing the access of region keys for a memory device with a deprecator according to an embodiment.

FIG. 3 is a block diagram showing region key access operations according to an embodiment. FIG. 3 shows portions of a memory device 300, including a deprecator 334, key store 318 and nonvolatile memory section 314. A nonvolatile memory section 314 can include a number of regions 320-0 to -n which can take the form of any of those described herein, or equivalents.

A key store 318 can store a number of keys corresponding to each region (m+1 keys). Thus, keys "region_0_key0" to "region_0_keym" are understood to correspond to region0 320-0. In the embodiment shown, keys are accessed via deprecator 334. Deprecator 334 can prevent a key value for a region from being repeated. Thus, each time there is a key access operation 336, deprecator 334 will disable access to that key. For example, in the embodiment shown, for an access to region0 320-0, value region_0_key0 was used, and so is no longer available for access operations to region0 320-0. Further, values region_n_key0 and region_n_key1 have been used, and so are no longer available for access operations to regionn 320-n.

A capability like that of FIG. 3 can enable the generation of ephemeral keys that are used in one communication session, and then discarded, for a very high degree of security.

Figure 4:
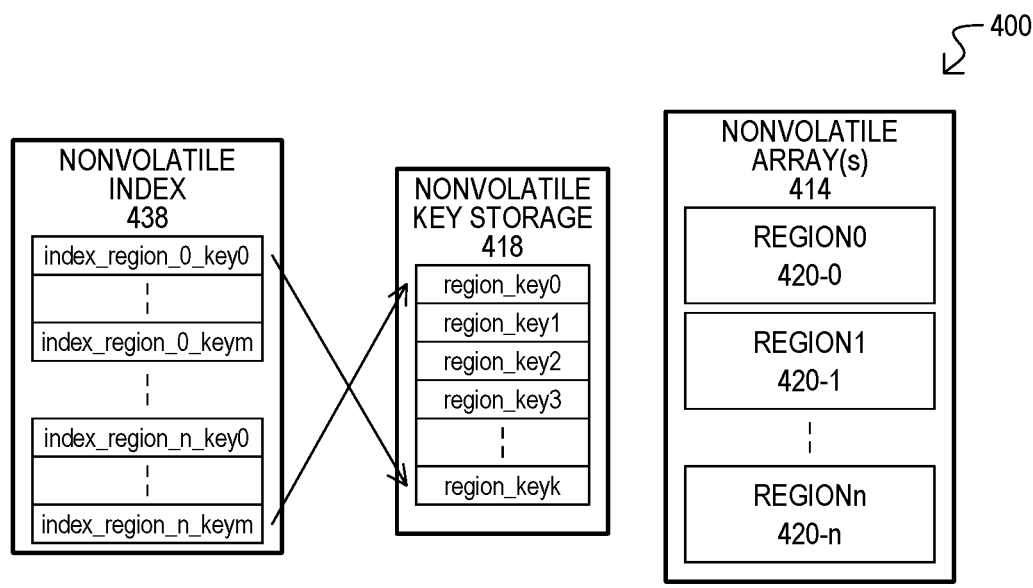
FIG. 4 is a diagram showing the access of region keys with nonvolatile indices according to an embodiment.

FIG. 4 is a block diagram showing region key access operations according to another embodiment. FIG. 4 shows portions of a memory device 400, including an index store 438, a key store 418 and nonvolatile memory section 414. A nonvolatile memory section 414 can include a number of regions 420-0 to -n as described herein, or equivalents.

A key store 418 can store a number of keys "region_key0" to "region_keyk", any of which can be assigned to any region (420-0 to -n). In the embodiment shown, keys are accessed via index store 438. Index store 438 can store multiple index values corresponding to each region (420-0 to -n) (m+1 in this case). Thus "index region_0_key0" to "index_region_0_keym" are understood to correspond to region 0 420-0. Index store 438 can include nonvolatile storage circuits which may or may not be part of key store 418 and can store index values securely.

A capability like that of FIG. 4 can provide great flexibility in assigning keys to regions (420-0 to -n), including more keys to one region than to another region, as well as no keys for some regions.

While embodiments can include various methods and circuits for assigning key values to particular regions of a nonvolatile memory device, embodiments can also include selectively enabling or disabling access to regions by a manufacturer by enabling or disabling keys known by the manufacturer (i.e., RMA keys).

For manufacturers of memory devices, it can be valuable to have access to protected regions of devices returned by customers or others. Such access can assist in repairing devices, retrieving data for a customer, as well as allowing for failure analysis. At the same time, a customer may consider certain data stored within a device as highly valuable, and thus wish for such data to remain secure once it has been programmed into the memory device.

FIGS. 5A to 5C are diagrams showing how access to regions of a nonvolatile memory device by a manufacturer can be enabled or disabled. FIG. 5A is a flow diagram of a method 540 according to an embodiment. A method 540 can include a customer designating one or more regions as not accessible by a manufacturer 540-0. The regions can be regions of a nonvolatile memory device as described for embodiments herein, or equivalents. Such an action can be used to ensure that sensitive information is not accessible if or when a memory device is returned to a manufacturer. For those regions so designated, keys known by a manufacturer (e.g., RMA keys) can be disabled by the customer 540-1. Such an action can include a customer erasing, overwriting or otherwise disabling keys known by the manufacturer for the designated regions. Keys can be accessed for such modification according to any of the embodiments shown herein or equivalents.

FIG. 5B is a flow diagram of a method 542 according to another embodiment. A method 540 can include a customer creating manufacturer codes for regions of a memory device 542-0. Those regions that will be accessible by the manufacturer can then be programmed with the generated codes 542-1. The customer generated manufacturer codes can then be sent to the manufacturer 542-2. In this way, access regions by a manufacturer can be completely controlled by the customer.

FIG. 5C shows diagrams of a memory section before and after a programming operation to limit access by a manufacturer. FIG. 5C shows an initial nonvolatile memory section 514 having regions 520-0 to -n. Nonvolatile memory section 514 can take the form of any of those disclosed herein or an equivalent. Prior to a key programming operation, regions (520-0 to -n) can have undefined security features with respect to access by a manufacturer. FIG. 5C then shows a nonvolatile memory section 514' after a key programming operation. As shown, access keys for region0 520-0 do not include any manufacturer keys (i.e.; NO RMA). Accordingly, data stored in the region is not accessible by a manufacturer should the corresponding memory device or system be returned to a manufacturer.

Embodiments can also include memory devices with security features that can erase or otherwise make data unreadable in the event invalid accesses to the region are attempted (e.g., with bad keys or credentials). FIG. 6 is a flow diagram of such a method 646 according to an embodiment, A method 646 can include determining if access to a region is attempted with a bad key or credential 646-0. Such an action can include access attempts to one region of multiple regions of a memory device. A bad key or credential can include, but is not limited to, any of: a key that does not match valid keys for the region, including an expired key (e.g., due to deprecation); an intermediate key that does not generate a usable final key; an authentication code that does not decode to valid results. Optionally, a method 646 can return a warning in response to the attempted access 646-1. In response to an invalid access attempt (or optionally continued invalid attempts) a method 646 can erase, overwrite or otherwise prevent the data in the region from being accessed 646-2. In other embodiments, this can include locking access to the region via access circuits or the like (e.g., designating the region not readable, programmable or erasable), In an alternate embodiment, a method can execute an action like that shown in 646-2 in response to the use by a manufacturer of a manufacturer access code (i.e., RMA code).

Figure 7:
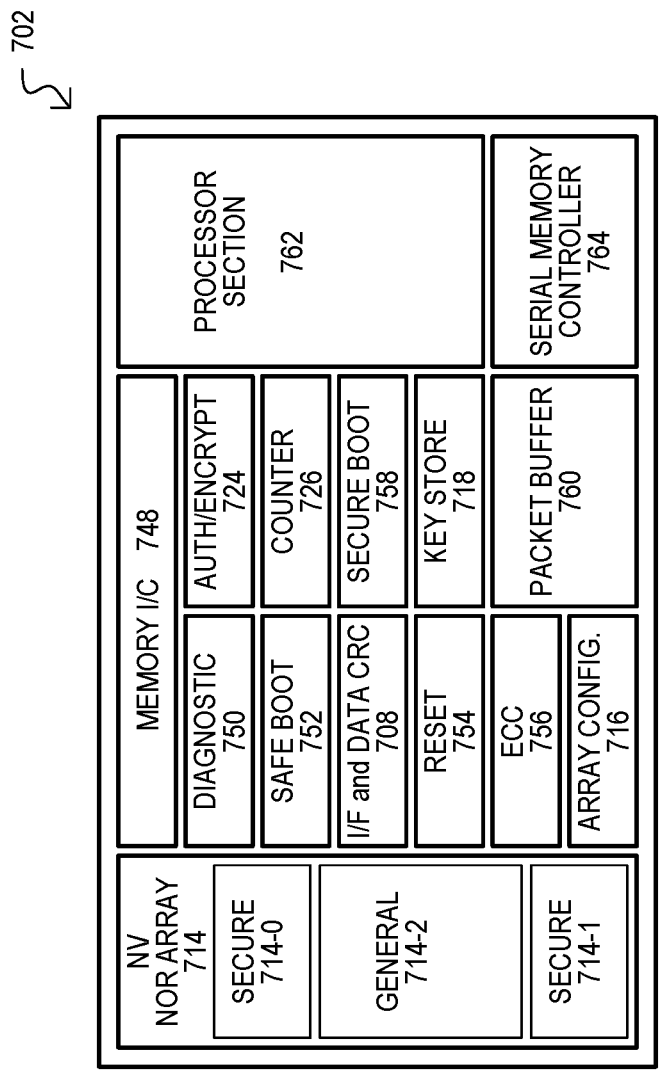
FIG. 7 is a block diagram of a memory device having regions with separately programmable security features according to another embodiment.

Referring to FIG. 7, a memory device 702 according to another embodiment is shown in a block diagram. In some embodiments, memory device 702 can be a more 0.5 detailed version of any of those memory devices shown in FIGS. 1-4. A memory device 702 can include a NOR flash array 714, memory interconnect (I/C) 748, diagnostic circuits 750, safe boot circuits 752, I/F and data CRC circuits 708, reset circuits 754, ECC circuits 756, array configuration circuits 716, authentication/cryptography (auth/crypt) circuits 724, counter circuits 726, secure boot circuits 758, key store 718, packet buffer 760, a processor section 762, and serial communications controller 764. NOR flash array 714 can include secure regions 714-0, 714-1 and general regions 714-2. Secure regions 714-0/1 can include regions that can be programmed with different access/security features as described herein and equivalents. Such security features can include requiring authentication and/or encryption. Secure regions 714-0/1 can also be programmed for access types (read, program, erase allowed or not allowed). General regions 714-2 can be regions that do not include security features. In some embodiments, the sizes/extents of the various regions 714-0/1/2 can be programmable. Further, region types 714-0/1/2 can have a default settings and can be changed by programming region access values (i.e., any or all of general regions 714-2 could be programmed to be secure regions).

Memory I/C 748 can interconnect various portions of the memory device 702 and can include any suitable buses. Diagnostic circuits 750 can include circuits for determining the functionality of the memory device 702, and in some embodiments can include one or more serial test access ports (e.g., JTAG standard). Safe boot circuits 752 can enable the memory device 702 to power up into a condition with limited capabilities. I/F and data CRC circuits 708 can provide an interface for the memory device, including any of those described herein. In some embodiments, the interface can be packet processing interface. I/F and data CRC circuits 708 can also execute a CRC operation on received data to determine if the data has been corrupted. Reset circuits 754 can enable the reset operations for the memory device 702, including those in response to command, power-on, or other predetermined conditions. ECC circuits 756 can perform error detection and correction on data values received via interface (e.g., 708) with ECC codes included with the received data.

Array configuration circuits 716 can store configuration data for regions of NOR flash array 714, including secure regions 714-0/1. Such configuration data can include any of those described herein and equivalents, including physical address data to define region extents, access type permissions, keys or index to keys. Array configuration circuits 716 can include nonvolatile storage circuits for storing such values.

Auth/crypt circuits 724 can include circuits for executing authorization and/or encryption operations on transactions for memory device 702. In some embodiments, such operations can access key store 718 to retrieve key values based on a region identification (i.e., a value that identifies a particular region of NOR flash array 714). Auth/crypt circuits 724 can also access counter circuits 726 to read count values for such operations. Counter circuits 726 can include one or more NMCs that are configurable as described herein or an equivalent.

Secure boot circuits 758 can enable a memory device 702 to authenticate a requesting device based on shared secret values established beforehand. Further, secure boot circuits 738 can generate code values that are unique to the memory device 702 as well as unique to firmware stored on the memory device.

A key store 718 can securely store key values for security related operations and can take the form of any of those disclosed herein or equivalents. A packet buffer 760 can buffer packets received via I/F 708, for processing by the memory device 702.

A processor section 762 can include one or more processors for executing various operations of the memory device 702, including security related operations. In some embodiments, a processor section can include a lower power consumption processor, such as one having reduced instruction set. A serial communications controller 764 can control serial communications with the memory device 702 according to any suitable protocol or standard, including but not limited to SPI, serial SPI, Quad SPI, or HyperBus™.

Figure 8A:
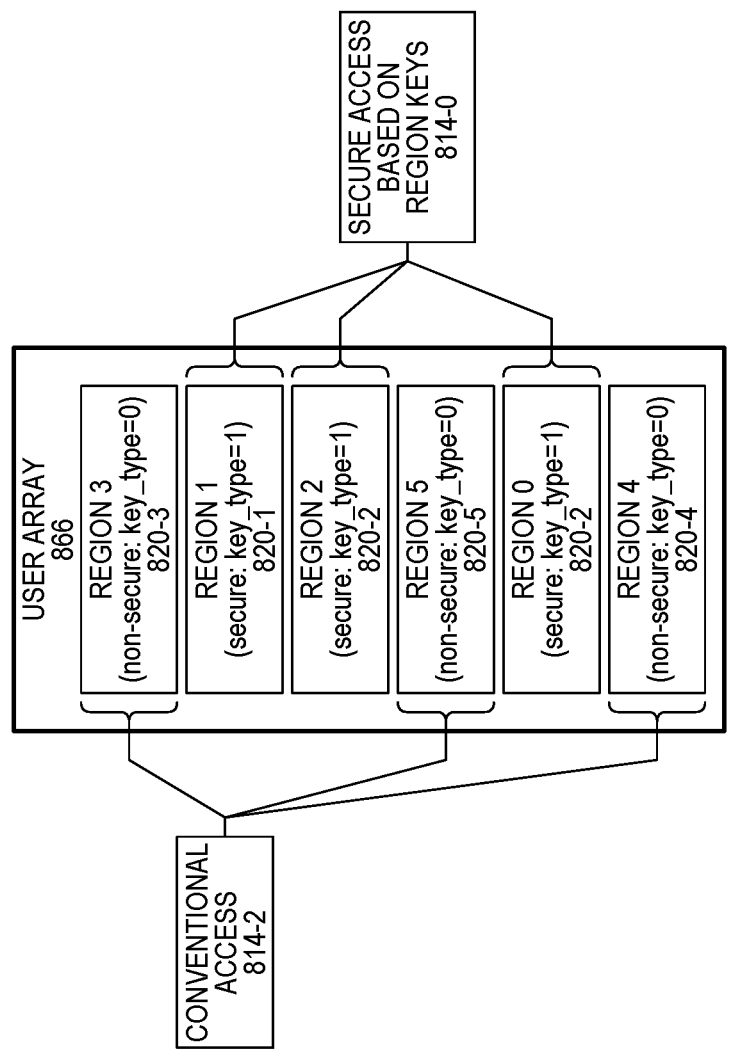

FIG. 8A is a diagram showing user defined partitioning of a nonvolatile array according to an embodiment. FIG. 8A shows a user array portion 866, which can be a portion of a nonvolatile memory array section of a memory device, including those disclosed herein and equivalents. In some embodiments, user array portion 866 can include NOR flash type arrays, A user array portion 866 can be organized into a number of different regions 820-0 to -n. As in the case of other embodiments herein, regions can 0.5 have preset sizes, or can have sizes set by a user.

Access to each region (820-0 to -n) can be configured by a user. A value can be assigned for each region (820-0 to -n). Based on the value, a region can be accessed in a conventional manner or may require secure access. In the embodiment shown, when a "key_type" value is "0", a region can be configured for conventional access. If the "key_type" value is "1", a region can be configured for secure access. Thus, regions 0, 1 and 2 (820-0,1,2) can be secure access regions 814-0, while regions 3, 4 and 5 (820-3,4,5) can be conventional access regions 814-2.

FIG. 8B is a table showing region type values that can be used to establish a region access type according to an embodiment. The arrangement of FIG. 8B is understood to be exemplary and should not be construed as limiting. In the table of FIG. 8B, column REGION_KEY_TYPE provides a general description for the type of region defined by the value. Column KEY # shows a key number assigned to the type of access and can correspond the values shown in FIG. 8A. For a region with a KEY TYPE #=0, no key is required to access the regions. Further, the region is not considered part of a user array (e.g., not logically mapped to a user array address space that defines regions programmed to be secure). In contrast, for a region with a KEY TYPE #=1, accesses can require knowledge of a stored key shared between the memory device and another device (e.g., host device), Further, session key can be used for encryption operations and/or the generation of an message authentication code (MAC) for authentication operations.

The remaining columns are divided into two parts, a "Normal Mode" and a "Crypto Mode". A Normal Mode corresponds to accesses without security features, including read, program and erase operations. Crypto Mode describes three different security features for a region, including AUTHENTICATED LOCK/UNLOCK, AUTHENTICATED READ/PROG/ERASE and ENCRYPTED READ/PROG/ERASE, AUTHENTICATED LOCK/UNLOCK indicates a region requires an authenticated request to lock and unlock access to the region. Such an authenticated request can be generated by another device (e.g., host device) with knowledge of a valid key for the region, and in some embodiments, a valid count value as well (e.g., count generated by an NMC on the memory device). AUTHENTICATED READ/PROG/ERASE indicates a region requires an authenticated request to execute read, program or erase operations on the region. ENCRYPTED READ/PROG/ERASE indicates a region requires encryption and decryption in access operations to the region. Such encryption and decryption can utilize a valid key for the region, and in some embodiments, a valid count value.

FIG. 8C is a table showing how secure regions can have additional values that define the types of accesses allowed for a region. In the table of FIG. 8C, the PERMISSION TYPE column describes the type of restriction. Column ACCESS # assigns a numerical value for a type of access restriction. As in the case of FIG. 8B, the remaining columns are divided into two parts, a "Normal Mode" and a "Crypto Mode". For the permission type UNRESTRICTED, in a normal mode, standard read, program and erase operations are permitted. In the crypto mode, authenticated read, program and erase operations are permitted, however, encrypted operations are not permitted. For the permission type READ_ONLY, in the normal mode, standard read operations are allowed, but program and erase operations are not permitted. In the crypto mode, authenticated read, program and erase operations are permitted, but encrypted operations are not permitted. For the permission type WRITE_PROTECTED, in the normal mode, standard read operations are allowed, but program and erase operations require that the region first be unlocked. In the crypto mode, authenticated read, program and erase operations are permitted, but encrypted operations are not permitted. For the permission type READ_WRITE_PROTECTED, in the normal mode, read, program and erase operations require that the region be unlocked first. In the crypto mode, authenticated read, program and erase operations are permitted, but encrypted operations are not permitted. For the permission type ENCRYPTED_ONLY, in the normal mode, read, program and erase operations (i.e., unencrypted operations) are not allowed. In the crypto mode, authenticated read, program and erase operations are not permitted, but encrypted read, program and erase operations are permitted.

Of course, the examples of FIGS. 8A to 8C are understood to be exemplary, Alternate embodiments can provide a greater or lesser degree of granularity in permissions. For example, there may be an access type the requires encrypted read or program operations, and authenticated erase operations.

Figure 9A:
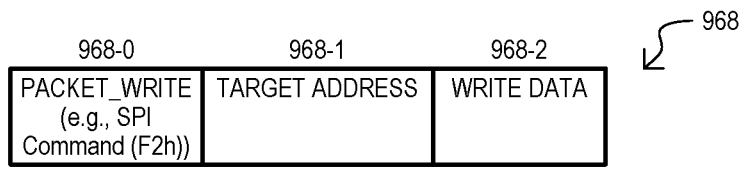
FIGS. 9A and 9B are diagrams showing communication methods that can be included in embodiments.
Figure 9B:
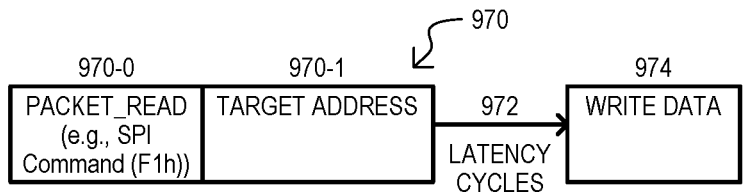

While embodiments can include memory devices that receive and process requests of any suitable form, in some embodiments memory devices (and their corresponding systems) can receive and process requests in packet form. FIGS. 9A and 9B are diagrams showing packet formats according to embodiments. FIG. 9A is a diagram of a write (i.e., program) packet 968 according to an embodiment, Write packet 968 can include a command field 968-0, a target address field 968-1 and a write data field 968-2. A command field 968-0 can include bit values that define a command for processing by a command decoder in a memory device. In the embodiment shown, the command has a hexadecimal value F2h, but such a value should not be construed as limiting. Further, the packet 968 can be received on an SPI interface, but this should also not be construed as limiting. A packet 968 can be received on any suitable interface, A target address field 968-1 can indicate the locations where data is to be written (e.g., programmed). In some embodiments, a target address field 968-1 can also identify, directly or indirectly, the region in which the write operation is to take place. In the direct case, the target address field 968-1 can include a subfield that identifies the region (i.e., a region number). From the region number, a memory device can determine what security restrictions, if any, are placed on the region, and ensure that the write request meets such restrictions. In the indirect case, a memory device can decode a target address to determine the target region, A write data field 968-8 can include the write data to be written into the memory device. As will be shown for other embodiments herein, write data can be encrypted if required by the region security value. Further, a packet 968 can also include a MAC in the event accesses to the targeted region requires authentication.

FIG. 9B is a diagram of a read packet 970 according to an embodiment. Read packet 970 can include a command field 970-0 and a target address field 970-1, A command field 970-0 can include bit values that define a command and in the embodiment shown, has a hexadecimal value F1 h. The packet 970 can be received on an SPI interface, but the interface and particular bit value should not be construed as limiting. A target address field 970-1 can indicate the locations from which data are to be read, but can also identify directly or indirectly, the region in which the read operation is to take place.

If the read packet 970 is valid, following a latency period 972, a memory device can output (or make available for retrieval) read data 974 from the target address location(s).

Figure 10:
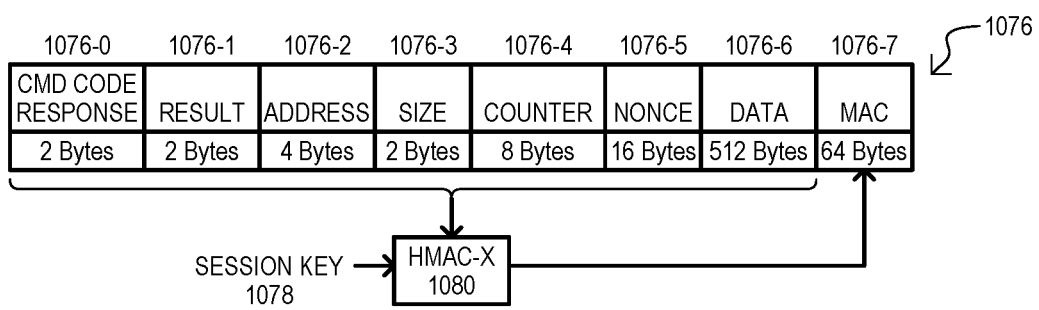
FIG. 10 is a diagram showing the generation of a packet and corresponding message authentication code (MAC) according to an embodiment.

FIG. 10 shows an authenticated packet 1076 according to an embodiment. Authenticated packet 1076 can include a number of fields. A command code response field 1076-0 can indicate a response type, and in the embodiment shown, can be a 2 byte value. A result field 1076-1 can indicate the result from a received request, and in the embodiment shown, can be a 4 byte value, A size field 1076-3 can indicate a size for the packet (e.g., size of a payload), and in the embodiment shown can be a 2 byte value. A counter field 1076-4 can provide a count value, such as that generated by a NMC, and in the embodiment shown can be an 8 byte field. A nonce field 1076-5 can provide a cryptographic nonce value, and in the embodiment shown can be a 16 byte value. A data field 1076-6 (which can be optional depending upon the type of response) can provide data related to the response (e.g., read data), and in the embodiment shown can be up to 512 bytes, A MAC field 1076-7 can provide a MAC for the response, which in the embodiment shown can be a 64 byte value, A MAC can be generated with any suitable authentication routine, can use a region key value (e.g., a secret or other security key assigned to the region corresponding the operation). In FIG. 10, the MAC can be generated with a hash based authentication code (HMAC) algorithm 1080, such as HMAC-SHA2 or SHA3 as but two of many possible examples. The HMAC algorithm 1080 can utilize fields 1076-0 to 1076-6 and a session key 1078 to generate the MAC for field 1076-7. A session key 1078 can be generated with a region specific key. Thus, authentication can be based on a key specific to the region being accessed.

Figure 11:
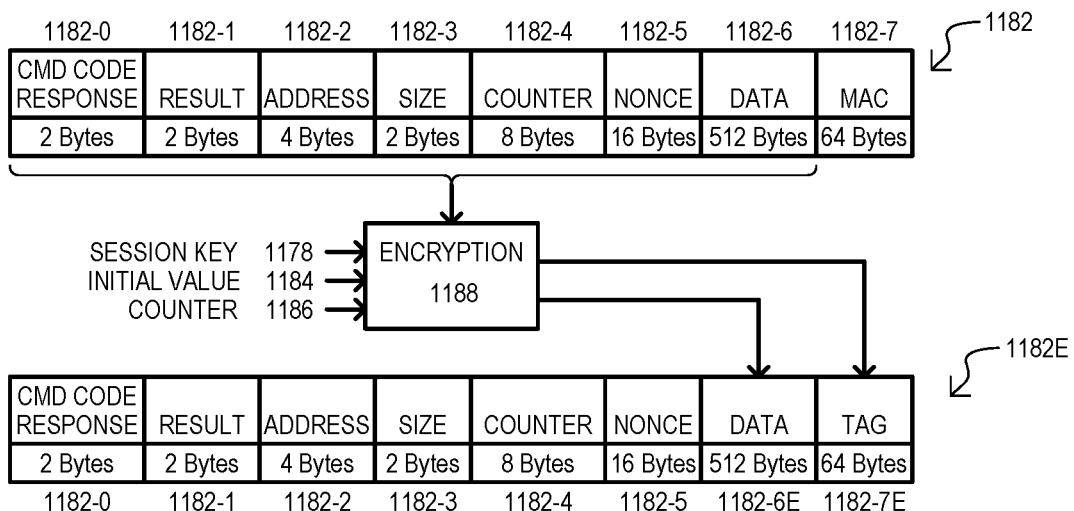
FIG. 11 is a diagram showing the encryption of a packet according to an embodiment.

FIG. 11 shows a packet encryption operation according to an embodiment. The operation can take an unencrypted packet 1182 and generate an encrypted packet 1182E. Unencrypted packet 1182 can include fields like those shown in FIG. 10, including a command code response field 1182-0, a result field 11786-1, a size field 1182-3, counter field 1182-4, a nonce field 1182-5, a data field 1182-6, and MAC field 1182-7. In the embodiment shown, such fields can have the same byte size as those of FIG. 10.

To generate encrypted packet 1182E, data for the packet can be encrypted and then transmitted as an encrypted payload. In the example shown, an encryption algorithm 1188 can encrypt fields 1182-0 to 1182-6 using a session key 1178, an initial value 1184 and a counter value 1186. Encryption algorithm 1188 can be any suitable algorithm, such as AES-GCM or AES-CBC as but a two of many possible examples. The encryption operation can generate encrypted data for an encrypted data field 1182-6E as well as resulting TAG bits for a TAG field 1182-7E. As in the case of FIG. 10, a session key 1178 can be generated with a region specific key. Thus, the encryption authentication can be based on a key specific to the region being accessed.

FIGS. 12A and 12B show a request packet and corresponding response according to an embodiment. In particular, FIGS. 12A and 12B show a program request and response. However, from the description of these packets, one skilled in the art would understand request and response packets for other functions, such as read or erase operations.

FIG. 12A shows an authenticated request packet 1284 that includes the following fields, A command code field 1284-0 can indicate an operation (in this case a program operation). In the embodiment shown, this field can be a 2 byte field with a hexadecimal value 0004h, and occupy byte locations [1:0]. An address field 1284-1 can indicate a target address for the command. In the embodiment shown, this field can be a 4 byte field and occupy byte locations [5:2]. A size field 1284-2 can indicate a size of packet data (in bytes), and in the embodiment shown can be a 2 byte field that occupies byte locations [7:6]. A data field 1284-3 can include data for the associated operation (in this case data to be programmed into a region). In the embodiment shown, this field can be up to 512 bytes and occupy byte locations [size-F7:2], where size is the size value, A MAC field 1284-4 can store a MAC for authentication operations. The MAC is generated by the requesting device (e.g., a host device). In the embodiment shown, this can be a 64 byte field and occupy byte locations [size+71:size+8].

Referring still to FIG. 12A, the diagram shows the values used to generate the MAC. As shown, an authentication algorithm, in this case an HMAC algorithm, can use a region_session_key, the command code (field 1284-0), the address (field 1284-1), the data field (1284-3) and a COUNTER value. A region_session_key can be a value particular to the region being accessed (in this case the region where data is being programmed), A COUNTER value can be a one-time count value, such as that generated by a NMC. Thus, a COUNTER value is included in the MAC, but not transmitted in the packet. In this way, authentication can be made region dependent.

FIG. 12B shows an authenticated response 1286 that includes the following fields. A response field 1286-0 can indicate a response to a requested operation (in this case an indication it is a response to a program request), A result field 1286-1 can indicate the result of the request (e.g., program successful, program not successful, authentication failed, etc.). A MAC field 1286-2 can store a MAC generated by the memory device. An authentication algorithm, in this case the HMAC algorithm corresponding to that of the requesting device, can use the region_session_key, the response value (field 1286-0), the result value (field 1286-1) and a COUNTER value. The COUNTER value can be a one-time count value, such as that generated by a NMC.

Figure 13:
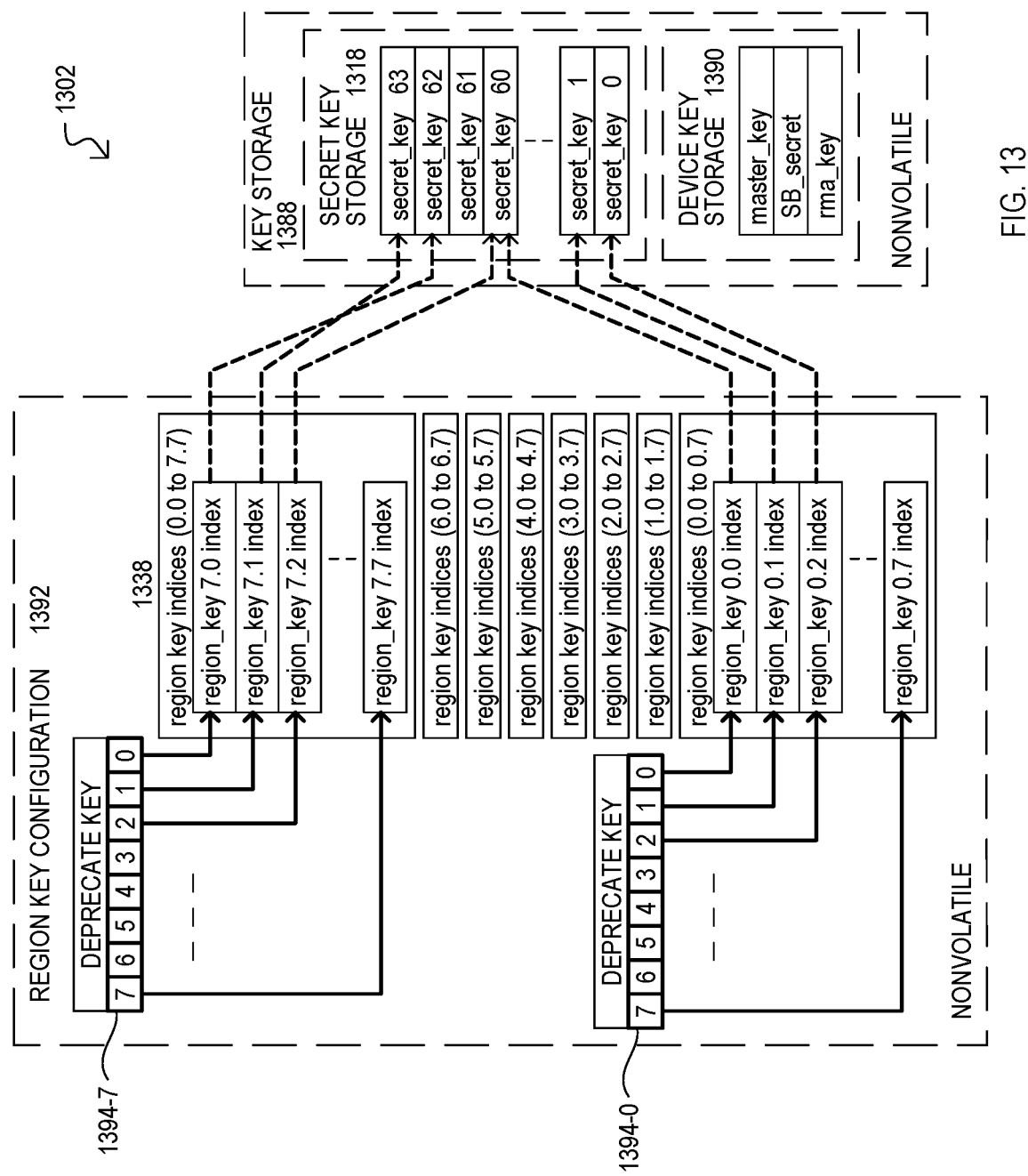
FIG. 13 is a diagram of a nonvolatile key indexing and storage structure for a memory device according to an embodiment.

FIG. 13 is a diagram of key storage and access architecture for a memory device 1302 according to an embodiment. A memory device 1302 can take the form of any of those disclosed herein or an equivalent. The architecture disclosed can be one particular implementation of those shown in FIGS. 3 and/or 4.

A memory device 1302 can include a region key configuration section 1392 and a key storage section 1388. It is assumed that the memory device also includes eight nonvolatile storage regions configurable for secure access (e.g., using authentication or encryption) through the use of secret keys. Both sections 1392 and 1388 can include nonvolatile circuits to store values and maintain states (e.g., deprecator states).

A region key configuration section 1392 can include region key indices 1338 and deprecate keys 1394-0 to 1394-7. Region key indices 1338 include a set of index values for each region. In the labeling convention shown, region key indices "region_key 0.0 index" to "region_key 0,7 index" are eight indices for region 0, region key indices "region_key 1.0 index" to "region_key 1.7 index" are eight indices for region 1, etc. Each region key index can be programmed to point to a secret key in key storage section 1388. Access to each group of indices can be controlled according to a corresponding deprecate key (1394-0 to -7), When a secret key is accessed for a region, the corresponding deprecate key (1394-0 to -7) can be changed to ensure the next index from the group will be different from the current one being used (thus the next key will be different as well), In the embodiment shown, each deprecate key (1394-0 to -7) can have eight values corresponding to each region index of its corresponding region, however this should not be construed as limiting.

A key storage section 1388 can include a secret key storage 1318 and a device key storage 1390. A secret key storage 1318 can include a number of secret keys assignable to any user defined secure region by programming the region key indices 1338. While FIG. 13 shows 64 secret keys ("secret_key 0" to "secret_key 63"), which could allow for eight keys per region, this should not be construed as limiting. A memory device can include greater or fewer than 64 keys. Further, regions can be assigned different numbers of secret keys. Each region index ("region_key 0,0 index" to "region_key 7.7 index") can be configured to point to any of the secret keys ("secret_key 0" to "secret_key 63"), Such a pointing arrangement can take any suitable form, including but not limited to pointing to register and/or address locations that store the secret keys.

In addition to storing secret keys for user defined secure accesses to storage regions, a key storage section 1388 can also secure secret keys for other functions in device key storage 1390, In the embodiment shown, device key storage 1390 can store a master_key, SB_secret key, and an rma_key. A master key can be a unique key for the memory device and known to a host device to enable authentication operations, An rma_key can enable a manufacturer to access the device. In some embodiments, an rma_key can enable global access to a device. However, as noted herein, rma keys can be assigned on a region by region basis. A SB_secret can be a secure boot secret key for enabling boot operations that can authenticate the memory device 1302 as well as firmware stored by the memory device 1302.

While embodiments can use any suitable security process for controlling access to individual regions of a memory device, particular embodiments will now be described. FIGS. 14A and 14B are diagrams showing request and response packets for generating a session key according to an embodiment. A session key can be used to generate a MAC for an authentication process and/or encrypt data in an encryption process. A session key can be generated with region key. Accordingly, session keys can be unique to the region being accessed. In this way, communications with a host device can be limited to a specific region (or regions) of a memory device.

Referring to FIG. 14A, a request packet for creating a session key can include six fields, A CMD Code field can indicate the operation (in this case a request to create a session key). In the embodiment shown, this field can be a 2 byte field with a hexadecimal value 000Ah, and occupy byte locations [1:0]. An Algorithm field can indicate the type of algorithm to be used. In the embodiment shown, this field can be a 2 byte field and occupy byte locations [3:2]. Further, a value of 0000h can indicate an HMAC authentication algorithm for generating a MAC value. A value of 0001h can indicate an EDCH P-256 type encryption, while a value of 0002h can indicate an EDCH 25519 type encryption. An Address field can indicate a target region for the session. In the embodiment shown, this field can be a 2 byte field and occupy byte locations [5:4]. A nonce field can store a nonce value generated for the session. In the embodiment shown, this field can be a 16 byte field that occupies byte locations [12:6]. A Data field can be empty (for an initial request) or can contain a host intermediate key for transmission to the memory device. In the latter case, the data field can be a 32 byte field that occupies byte locations [53:22]. A MAC filed can store a MAC for the request. In the embodiment shown, this can be a 64 byte field and occupy byte locations [85:22] or [117:54], depending upon whether a host intermediate key is included.

Referring still to FIG. 14A, the generation of particular values in the creation of session key will now be described. As shown in the fifth row of FIG. 14A, in the case of an HMAC algorithm, a MAC can be generated by the host device with an HMAC algorithm using a region_key (secret key for the region indicated in the Address field), the command code, the algorithm code, the region number, the nonce value, and a command counter value, A command counter value can be a count value provided by a NMC in the memory device being accessed. Further, a region_session_key can be generated with an HMAC algorithm using the region_key, the command code, the region number, the nonce value, and the command counter value.

As shown in the last row of FIG. 14A, in the case of an elliptical curve Diffie-Hellman (ECDH) type algorithm, a MAC can be generated by the host device with an HMAC algorithm using the region_key, the command code, the algorithm code, the region number, the nonce value, and the host intermediate value. A region_session_key can be generated with an ECDH algorithm using the host intermediate value and a device initial value (device_dh_initial) received from the memory device being accessed.

Referring to FIG. 14B, a response packet for creating a session key can include four fields, A Response field can indicate the response type (in this case a response to a request to create a session key). In the embodiment shown, this field can be a 2 byte field with a hexadecimal value 0A00h, and occupy byte locations [1:0]. A Result field can indicate the result of the request (e.g., successful, not successful). In the embodiment shown, this field can be a 2 byte field and occupy byte locations [3:2], A Data field can be empty or can contain a device intermediate key for transmission to the host device. In the latter case, the data field can be a 32 byte field that occupies byte locations [34:4]. A MAC field can store a MAC for the response. In the embodiment shown, this can be a 64 byte field and occupy byte locations [67:4] or [99:36], depending upon whether a device intermediate key is included.

Referring still to FIG. 14B, the generation of particular values for a response to create a session key will now be described. As shown in the fifth row of FIG. 14B, in the case of an HMAC algorithm, a MAC can be generated by the memory device with an HMAC algorithm using a region_key, the response code, the result value, and a command counter value. In the case of an ECDH algorithm, a MAC can be generated with an HMAC algorithm using the region_key, the response code, the result value, the device intermediate value, and the command count value.

Figure 15A:
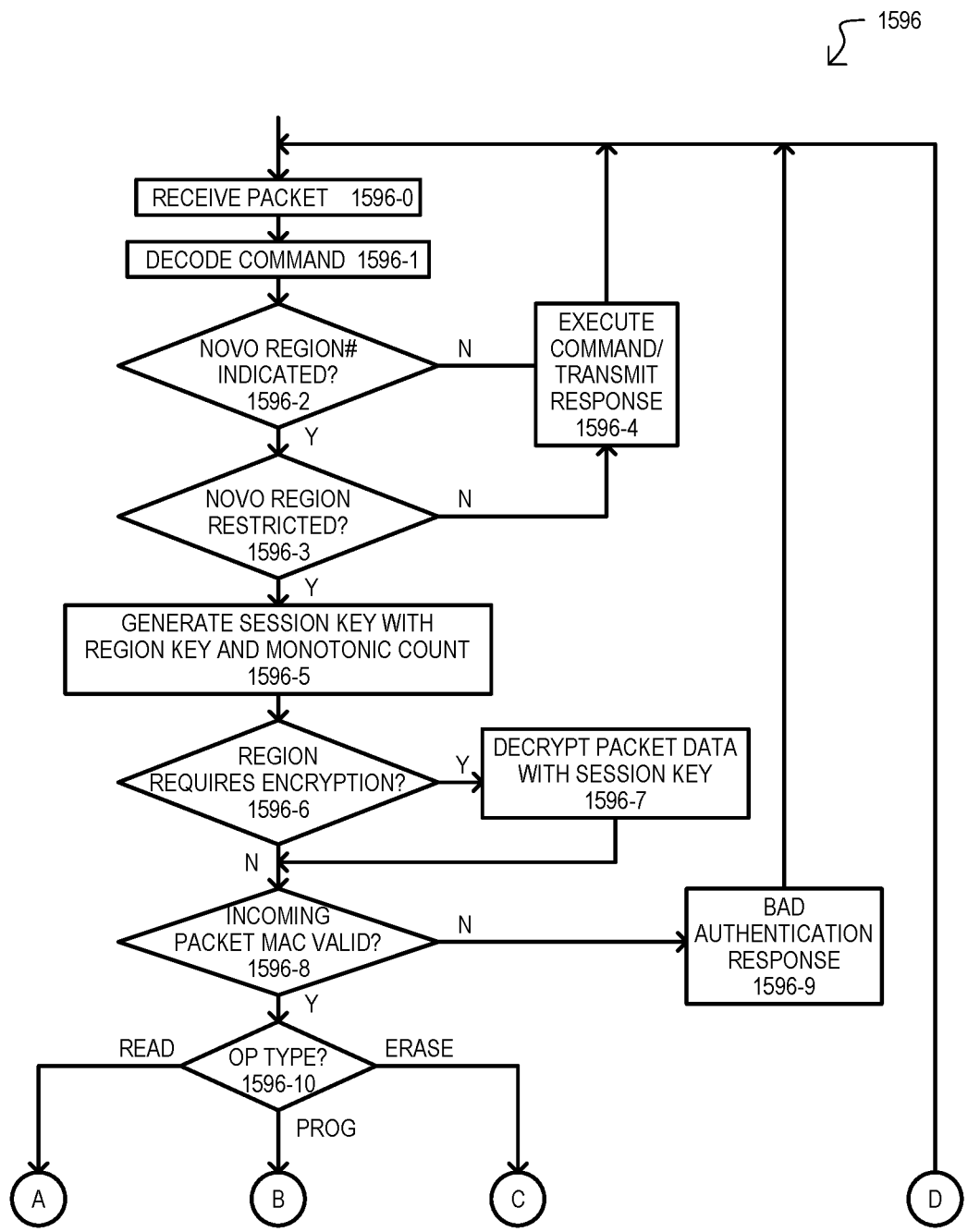
FIGS. 15A and 15B show a flow diagram for a method of secure accesses to regions of a memory device according to an embodiment.
Figure 15B:
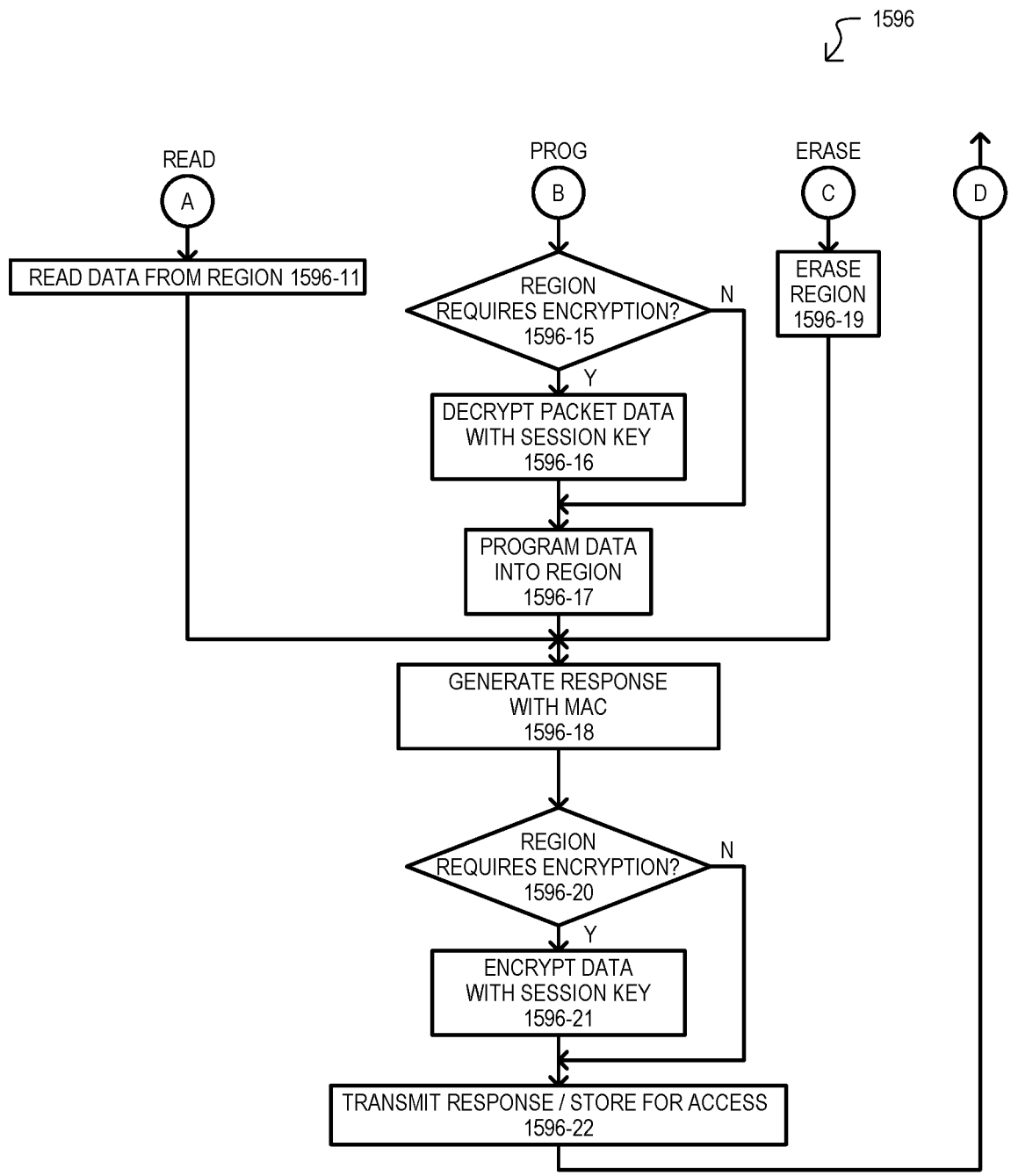

While embodiments above have described various methods in conjunction with devices and systems, particular methods will now be described with reference to flow diagrams. FIGS. 15A and 15B are flow diagrams showing a method 1596 of accessing nonvolatile storage regions of a memory device, where each region can be programmed with a different security feature. A method 1596 can include receiving a packet in the memory device 1596-0, Such an action can include receiving a packet over any suitable interface, and in some embodiments can include receiving a packet over a serial interface. A command code field of the packet can be decoded by the memory device 1596-1. Such an action can include any suitable command decoding operations, and in some embodiments can include reading predetermined locations of a buffer that contains the packet. A method 1596 can determine if a nonvolatile region is indicated 1596-2. Such an action can include decoding an address value or detecting a region number field in a packet, as but two of many examples. If a region number is not indicated (N from 1596-2), a method 1596 can execute the command, and if necessary, generate and transmit (or store for reading) a response 1596-4.

If a region number is indicated (Y from 1596-2), a method 1596 can determine if the region has an access restriction 1596-3. Such an action can include any suitable reference to configuration values, and in some embodiments can include accessing a secure nonvolatile storage location that includes bit values identifying the security configuration for the identified region. If the nonvolatile region is not restricted (N from 1596-3), a method 1596 can execute the command and generate a response 1596-4 (e.g., execute a conventional read, program or erase operation to the region).

If the nonvolatile region is subject to restricted access (Y from 1596-3), a method 1596 can generate a session key with a region key and monotonic count value 1596-5. A method 1596 can also determine if the region requires encryption 1596-6. If the region does require encryption (Y from 1596-6), a method 1596 can decrypt packet data with a session key 1596-7.

A method 1596 can determine if a MAC of the received packet is valid 1596-8. If the MAC is not determined to be invalid (e.g., the decoded values do not match), a method 1596-9 can follow a predetermined bad authentication response 1596-9, A bad authentication response can include any suitable response, including no response at all. If the MAC is determined to be valid (Y from 1596-8), a method 1596 can execute various operations depending on the access type 1596-10, In the embodiment shown, access types can include read, program and erase.

In FIG. 15A, circled letters A, B, C and D indicate corresponding connections in FIG. 15B.

Referring now to FIG. 15B, in a read operation, a method 1596 can include reading data from the targeted region 1596-11.

In a program operation, a method 1596 can determine if encryption is required 1596-15, If encryption is required (Y from 1596-15), the packet data can be decrypted using a session key 1596-16. The program data can then be programmed into the targeted nonvolatile region at the address(es) indicated by the packet 1596-17. Such an action can include programming according to any suitable fashion, and in some embodiments, can include erasing a portion of the region, and then selectively programming bits of the erased portion according to the program data.

In an erase operation, a method 1596 can erase the region indicated by the packet 1596-19.

After the indicated read, program or erase operation is complete (or cannot be completed), a response can be generated with a corresponding MAC 1596-18. A response can indicate the results of the indicated operation. In the case of a read operation, the response packet can include the read data, A method 1596 can determine if the accessed nonvolatile region required encryption 1596-20. If encryption is required (Y from 1596-20), the response data can be encrypted 1596-21. The response can be transmitted to the request device (e.g., host) or stored for subsequent retrieval by the requesting device 1596-22. In some embodiments, a response can take the form of a packet.

Figure 16:
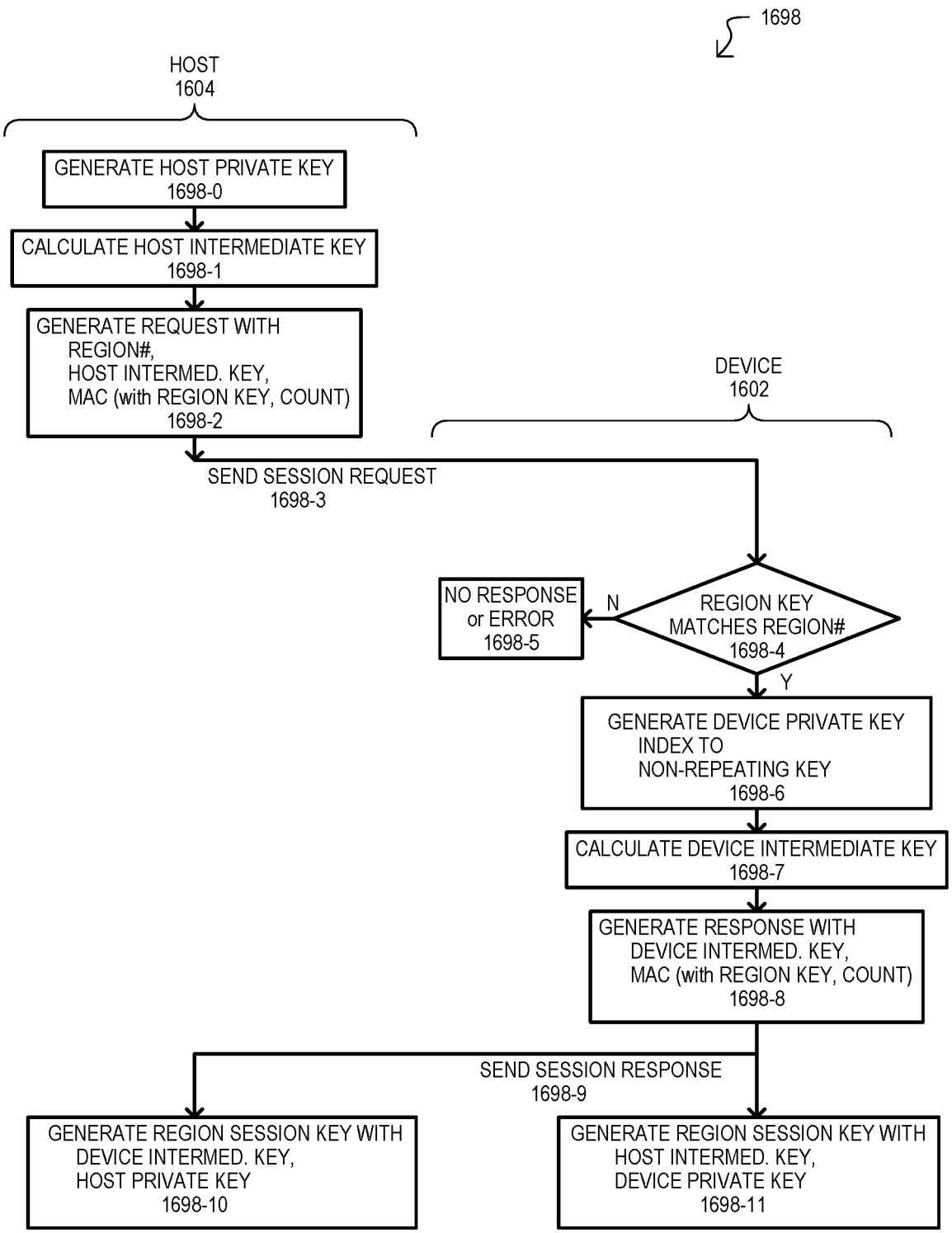
FIG. 16 is a flow diagram of a method for generating a session key for secure communications with a memory device and host device according to an embodiment.

FIG. 16 is a diagram of a method 1698 of generating a session key according to an embodiment. Method 1596 shows actions that can be executed by a host 1604 and actions that can be executed by a memory device 1602.

A method 1698 can include a host 1604 generating a private key 1698-0. A host can calculate a host intermediate key using the private key 1698-1, In some embodiments a host intermediate key can be a key generated with an EDCH algorithm using the host private key and parameters known to both the host 1604 and the memory device 1602. A host 1604 can then generate a request 1698-2. Such a request can include a region number, the host intermediate key, and a MAC generated with the region key for the targeted region, as well as a count value. In some embodiments, data within a request can also be encrypted. The session request can be sent to the memory device 1698-3. Such an action can include any suitable method, including both wired and wireless transport. In some embodiments, the request can be transmitted over wired serial connection in packet form.

A memory device 1602 can determine if a region key value received in the request matches a stored secret key for the region 1698-4. Such an action can include decoding a MAC in the request to derive the region key. If a received region key does not match the stored region key (N from 1698-4), a method 1698 can generate an error response or no response 1698-5.

If a received region key matches the stored key for the region (Y from 1698-4), the memory device can generate a device private key 1698-6. In some embodiments, such an action can include accessing a set of keys for the targeted region in an essentially non-repeating manner (e.g., with a deprecator), This may or may not include indirect access via index values as described herein and equivalents. The memory device 1602 can then calculate a device intermediate key using its private key 1698-7. As in the case of the host device, in some embodiments a device intermediate key can be generated with an EDCH algorithm using the device private key and parameters known to both the host 1604 and the memory device 1602.

A device can then generate a response 1698-8, Such a response can include the device intermediate key and a MAC generated with the region key and a count value. A count value can be generated with a NMC of the memory device 1602. The session response can then be sent to the host device 1698-9. Such an action can include any suitable method, including sending the response a predetermined delay after the request, or sending the response in response to another request by the host 1604.

Once the host device 1604 and memory device 1602 both have the intermediate keys of the other device, the devices 1604 and 1602 can generate a session key. Such a session key can be used to authenticate and/or encrypt communications between host device and memory device that are directed to the indicated region within the memory device. That is, the session key is derived from the region key, so sessions can be restricted to particular regions of the memory device.

While embodiments can provide for secure access to multiple regions of a storage device, embodiments can also include systems and methods for authenticating additional features of memory device.

Figure 17A:
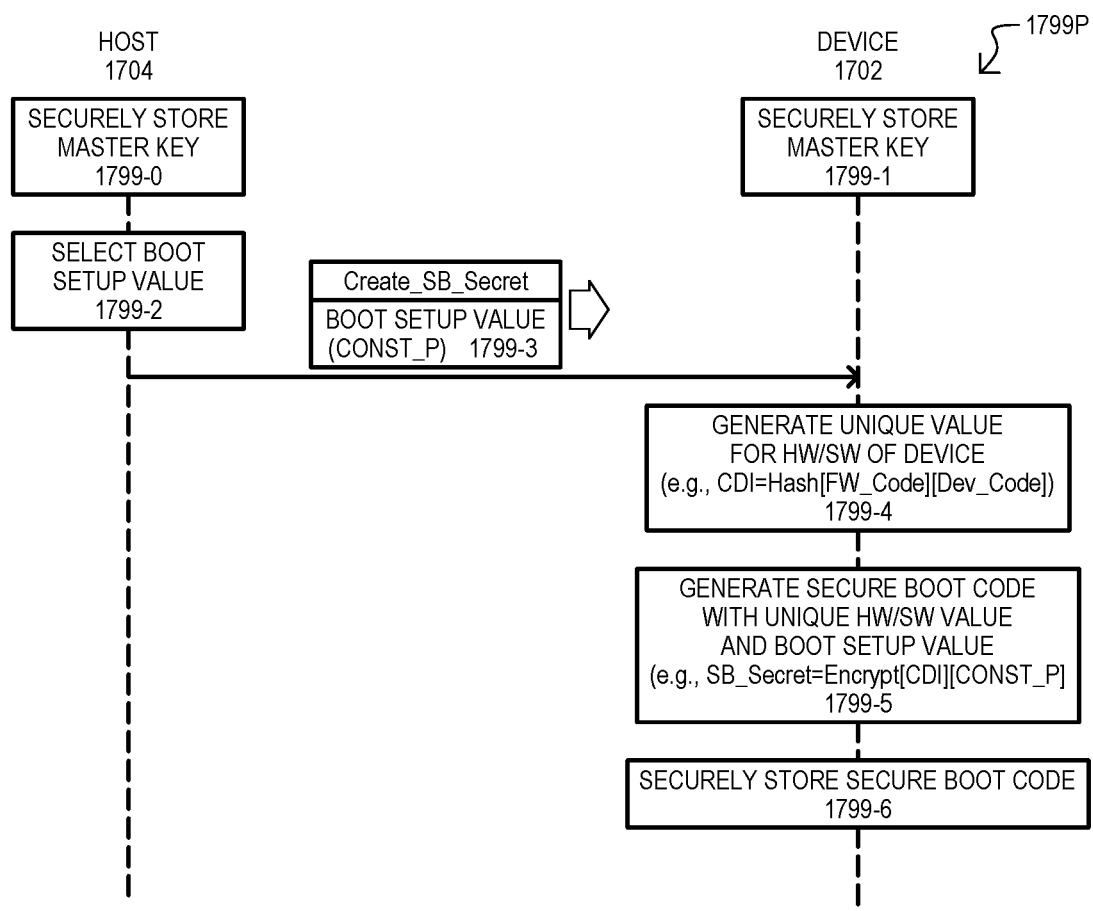
FIGS. 17A and 17B are diagrams showing a method of mutual authentication between a host device and a memory device with firmware according to an embodiment.
Figure 17B:
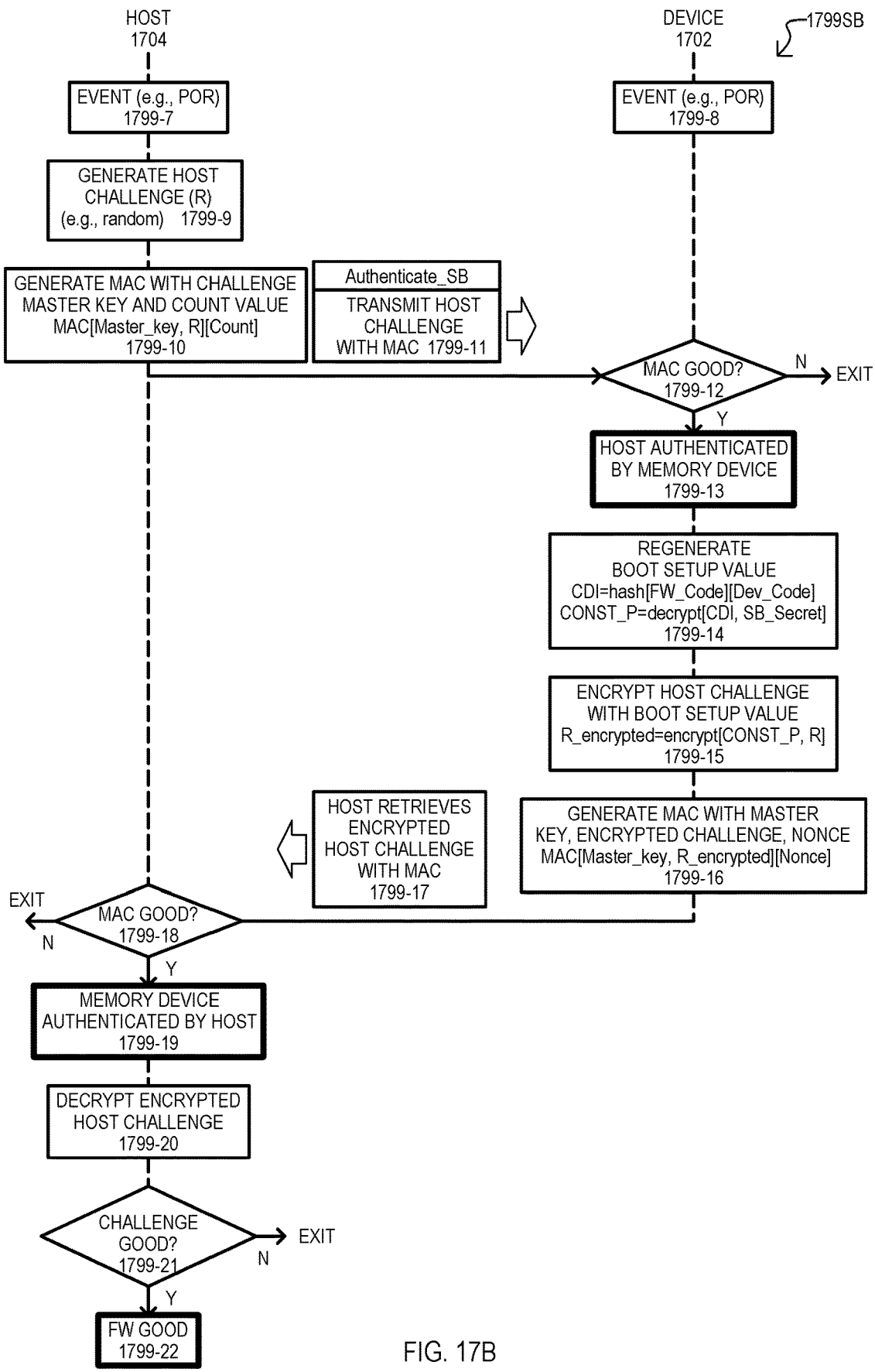

FIGS. 17A and 17B are diagrams showing authentication operations according to further embodiments. FIG. 17A shows a provisioning operation 1799P for a system having a host device 1704 and a memory device 1702 that stores firmware (FW) for the host device 1704. A memory device 1702 can take the form of any of those disclosed herein or an equivalent, and include nonvolatile storage locations for the FW. A provisioning operation 1799P can include securely storing a master key in the host device 1799-0 and the memory device 1799-1. Such an action can include the host device 1704 programming the master key into the memory device, the host device retrieving the master key from the memory device, or the master key being programmed into each device separately. A master key can be a secret key shared between the host device 1704 and memory device 1702.

A host device 1704 can then select a boot setup value 1799-2, A boot setup value (CONST_P) can be transferred to the memory device 1799-3. In some embodiments such an action can include a host device 1704 issuing a predetermined command (e.g., Create_SB_Secret). Such a command can be in packet form, with a command field identifying the command (create secure boot value) and a data field that includes the boot setup value.

Upon receiving the boot setup value, a memory device 1702 can generate a unique value for the hardware (HW) and FW of the memory device 1799-4, In some embodiments, this can include generating a value using a first value that identifies the FW (FW_Code) and a second value that identifies the memory device (Dev_Code) HW). In the embodiment shown, the unique value can be a "constrained data item" (CDI) formed by a hash function operating on the FW_Code and Dev_Code.

Having generated the unique HW/SW value (e.g., CDI), a memory device 1702 may generate a secure boot code (SB_Secret) using the boot setup value (e.g., CONST_P) received from the host device 1704. In the embodiment shown, such an operation can include encrypting the boot setup value with the unique HW/SW value (SB_Secret=encrypt[CDI, CONST_P]. The generated secure boot code can be securely stored in the memory device 1702.

In this way, a memory device 1702 can have a secure boot value that includes a secret value known to the host device (CONST_P) that can only be decrypted with a value unique to the HW/FW of the memory device (i.e., CDI).

FIG. 17B shows a secure boot operation 17995B for a system like that shown in FIG. 17A. That is, FIG. 17B shows a host device 1704 and a memory device 1702 that have been subject to the provisioning operation shown in FIG. 17A. A secure boot operation 1799SB can occur in response to any suitable predetermined condition in the host device 1799-7 or memory device 1799-8, including a power-on or reset condition as but one of many possible examples.

In a secure boot operation 17995B, a host device can generate a challenge value 1799-9. A challenge value (R) can be any suitable value, and in some embodiments can be a random number or pseudorandom number generated by the host device 1704. A host device 1704 can then generate a MAC using a master key and the challenge value. In some embodiments, the MAC can also include a count value, which can be an NMC value generated (and updated each time) by the memory device 1702. The current count value can have been established by previous communications with the memory device 1702, or can be an initial count value. A host device can then transmit the host challenge with the corresponding MAC to the memory device 1799-11. In some embodiments such an action can include a host device 1704 issuing a predetermined command (e.g., Authenticate_SB). Such a command can be in packet form, with a command field identifying the command and a data field that includes the host challenge value.

A memory device 1702 can receive the host challenge and MAC and determine if the MAC is valid using its own securely stored master key (and count value, if used) 1799-12. If the MAC is not valid (N from 1799-13), the memory device 1702 can exit the authentication process as the host device 1704 itself has failed authentication (e.g., it does not have a valid master key). If the MAC is valid (Y from 1799-13), the host device 1704 can be considered to have been authenticated by the memory device 1799-13. This is in contrast to conventional operations where only the host authenticates the FW of a storage device.

A memory device 1702 can regenerate the boot setup value established in a provisioning operation (e.g., FIG. 17A) 1799-14. In some embodiments this can include decrypting an encrypted value containing the boot setup value with a value unique to the HW/FW of the memory device. For example, a CDI can be generated with the values unique to the FW and HW (e.g., CDI=hash[FW_Code][HW_Code]). The CDI value can be used to decrypt the SB_Secret value and arrive at the boot setup value (CONST_P). Memory device 1702 can encrypt the regenerated boot setup value with the challenge value 1799-15 to create an encrypted challenge value (e.g., R_encrypted=encrypt[CONST_P, R]). A memory device 1702 can then generate a MAC for a challenge response with a master key, the encrypted challenge value, and optionally a nonce value 1799-16 (e.g., MAC[Master_key, R_encrypted][Nonce]).

The response and corresponding MAC can be retrieved by the host device 1799-17. Such an action can include any suitable response operation, including but not limited to the memory device transmitting the response a predetermined time after receiving the authentication request from the host or in response to another command/request from the host (e.g., read data or register command).

The host device 1704 can receive the response and corresponding MAC from the memory device and determine if the response MAC is valid 1799-18. In some embodiments this can include the host device 1704 using its own securely stored master key. If the MAC is not valid (N from 1799-18), the host device 1704 can exit the authentication process as the memory device 1702 is determined to have failed authentication. If the MAC is valid (Y from 1799-18), the memory device 1702 can be considered authenticated 1799-19.

The host device 1704 can then decrypt the encrypted host challenge 1799-20. Such an action can include decrypting with the boot setup value (e.g., CONST_P) established in the provisioning operation. If the host challenge is invalid (N from 1799-21), the host device 1704 can exit the operation as the FW is determined to be invalid. If the host challenge is valid (Y from 1799-21), the FW can be determined to be authenticated 1799-2.

In this way, a memory device 1702 can enable mutual authentication (i.e., host can authenticate memory device and memory device can authenticate host), as well as authentication of the memory device itself (i.e., HW) and the firmware stored by the memory device.

Figure 18:
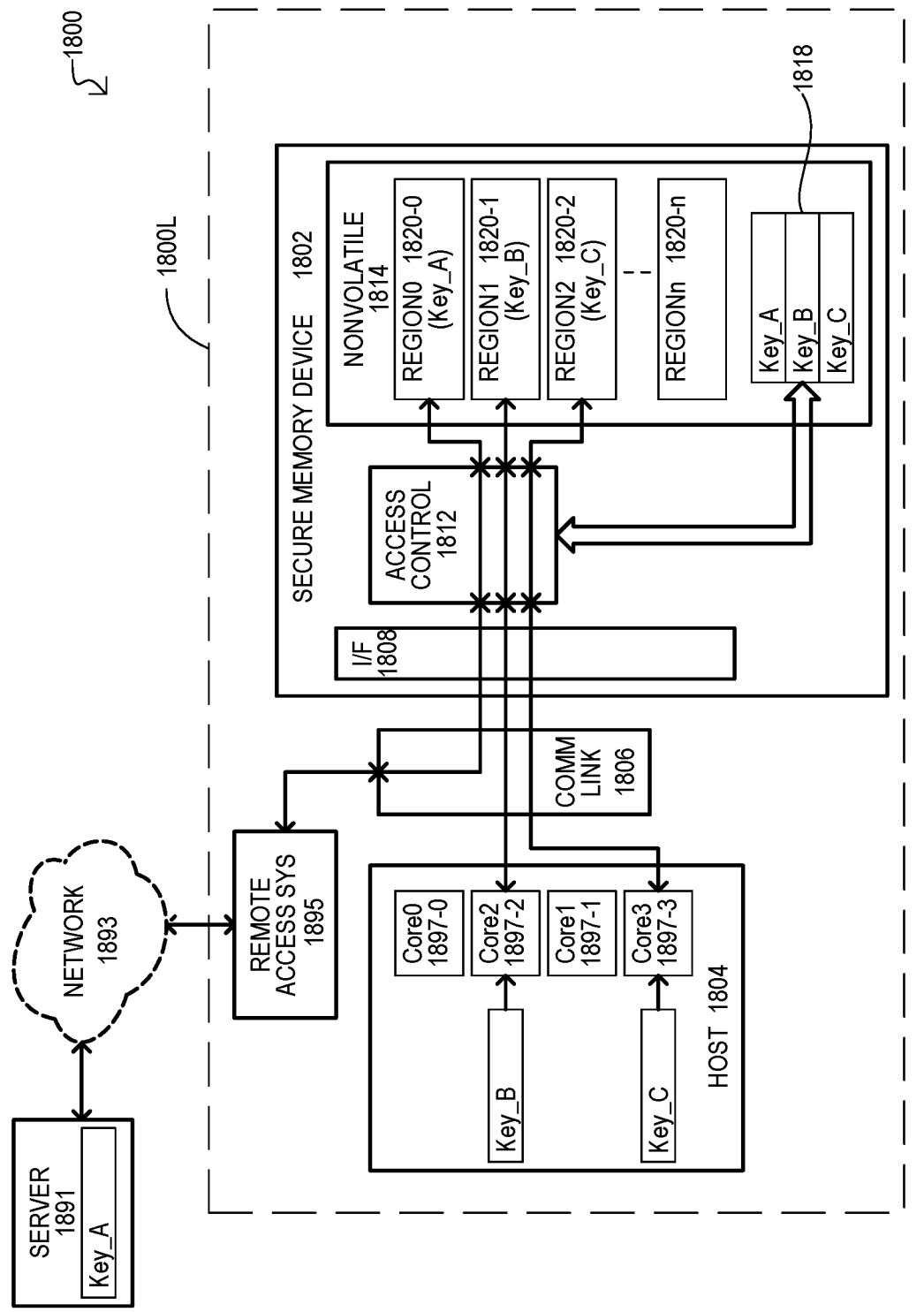
FIG. 18 is a diagram of a system with a memory device having regions which can be securely accessed by different devices and/or computing elements according to an embodiment.

While embodiments have disclosed systems and methods in which a host device accesses various regions of memory device based on keys, in other embodiments regions can be accessed by different processes or devices other than a host. FIG. 18 shows one example of such a system and method according to an embodiment.

FIG. 18 shows a system 1800 having secure memory device 1802, a host device 1804, a remote access system 1885, and a remote device 1891. A memory device 1802 can include an I/F section 1808, access control circuits 1812, and a nonvolatile section 1814. An I/F section 1808 can include one or more interfaces for communicating with host device 1802 and remote access system 1895. A nonvolatile section 1814 can include a number of different regions 1820-0 to -n as well as secure key store 1818. Regions (1820-0 to -n) can take the form of any of those described herein, or equivalents, A key store 1818 can store keys for the region (1820-0 to -n) in a nonvolatile fashion and take the form of any of those described herein, or equivalents. While FIG. 18 shows three keys (Key_A, Key_B, Key_C), it is understood that there can be many more keys, further such keys can change over time (e.g., with a deprecator or the like). In the embodiment shown, access to region0 1820-0 requires key Key_A, access to region1 1820-1 requires key Key_B, and access to region2 1820-2 requires key Key_C.

An access control circuit 1812 can control access to each of regions (1820-0 to -n) based on security controls for the region. Such controls can include any of those described herein, or equivalents, including but not limited to requiring an authentication or encryption/decryption operation that uses one or more keys assigned to the region.

A host device 1804 can include a number of processing elements 1897-0 to -3, each of which can execute different applications or functions. Processing elements (1897-0 to -3) can include any suitable processing element, including but not limited to: processing cores, processing threads, or different applications executed by processors. In the embodiment shown, element 1897-2 can have access to Key_B and element 1897-3 can have access to Key_C. In some embodiments, some or all access to keys by elements (1897-0 to -3) can be exclusive (e.g., element 1897-2 is the only element having access to Key_B).

A remote access system 1895 can enable remote devices (e.g., 1891) to access memory device 1802. In some embodiments, a remote access system 1895 can enable access via one or more wireless wide area network protocols.

A remote access system 1895 and host device 1804 can access the memory device 1802 via one or more communication links 1806. A communication link 1806 can be any suitable communication link as described herein and equivalents, including wired and wireless links. In one embodiments, communication links 1806 can include one or more high speed serial data buses.

Secure memory device 1802, host device 1804, communication links 1806 and remote access system 1895 can all be part of a local system 1800L. A local system 1800L can have components in close proximity to one another (e.g., on a same larger device).

In contrast to the local system 1800L, a remote device 1891 can be located in a different physical location than the memory device 1802. As but one example, a remote device 1891 can include a server in communication with local system 1800L via a larger network 1893. Network 1893 can be a wired or wireless network, including the internet. In the embodiment shown, remote device 1891 can have access to Key_A. In some embodiments, such access can be exclusive (e.g., host device does not possess or otherwise have access to Key_A).

In the embodiment shown, separate processes and devices can have access to different regions of memory device 1802, Assuming key access is exclusive, element 1897-2 can have access to region1 1820-1 by use of Key_B, while other devices and elements cannot access the region 1820-1. At the same time, element 1897-3 of the same device (host device 1804) can access region2 1820-2 by use of Key_C, but not access region0 1820-0 or region1 1820-1. Still further, remote device 1891 can access region0 1820-0 by use of Key_A, while no element in host device 1802 can access the region 1820.

Memory devices as disclosed herein can include regions formed with any suitable nonvolatile memory cell types and architecture. However, some embodiments can be formed of NOR type flash arrays, which can provide a high degree of granular access, faster access speeds, and be configured with the capability of enabling system to boot from firmware stored in the device. This is in contrast to NAND architectures.

Figure 19:
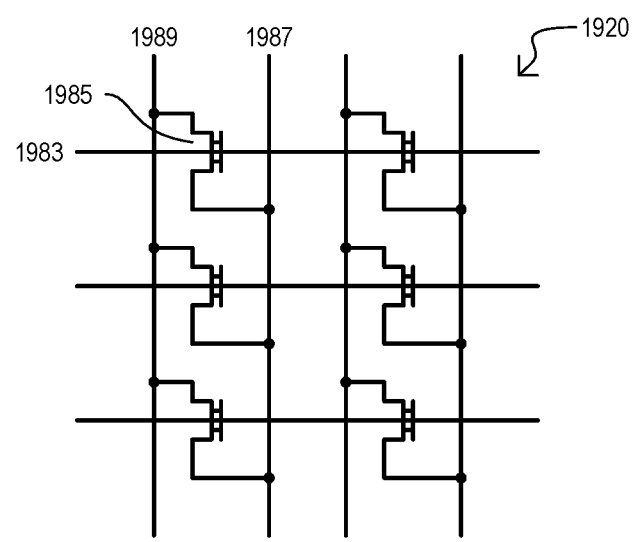
FIG. 19 is a diagram of a memory array that can be included in embodiments.

FIG. 19 is a diagram of a portion of a memory device region 1920 that can be included in embodiments. Region 1920 can include a number of flash memory cells (one shown as 1985) arranged in to rows commonly connected to a same word line (one shown as 1983) and columns commonly connected to a same bit line (one shown as 1987. In addition, groups of memory cells 1985 can be commonly connected to a same source line (one shown as 1987) to enable flash erasure of multiple cells in the same operation. It is understood that region shown in FIG. 19 is provided by way of example and should not be construed as limiting.

Figure 20:
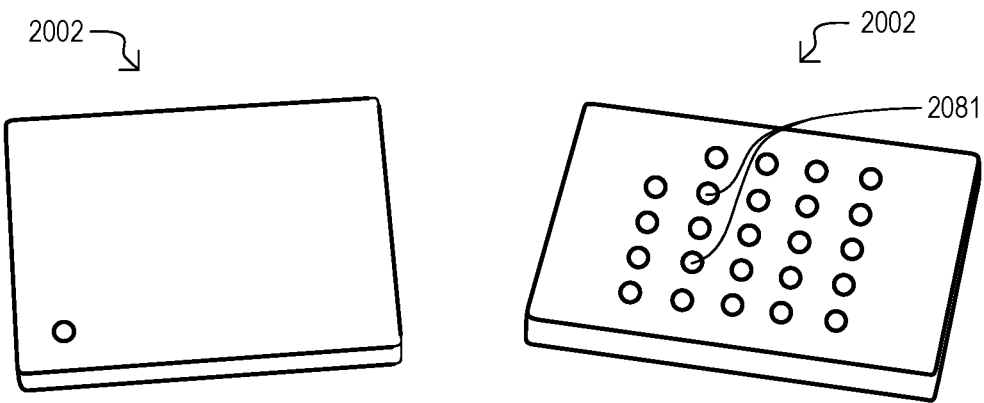
FIG. 20 is a diagram of a memory device according to an embodiment.

While embodiments can include systems with memory devices operating in conjunction with one other devices, embodiments can also include standalone memory devices capable of providing multiple regions, each having its own security features. While such memory devices can include multiple integrated circuits formed in a same package, in some embodiments memory devices can be advantageously compact single integrated circuits (i.e., chips). FIG. 20 shows a packaged single chip memory device 2002. Memory device 2002 can include multiple interface connections (two shown as 2081), Interfaces (e.g., 2081) can enable connections to one or more communication paths (e.g., serial bus). However, it is understood that memory devices according to embodiments can include any other suitable packaging type, including direct bonding of a memory device chip onto a circuit board substrate.

Figure 21:
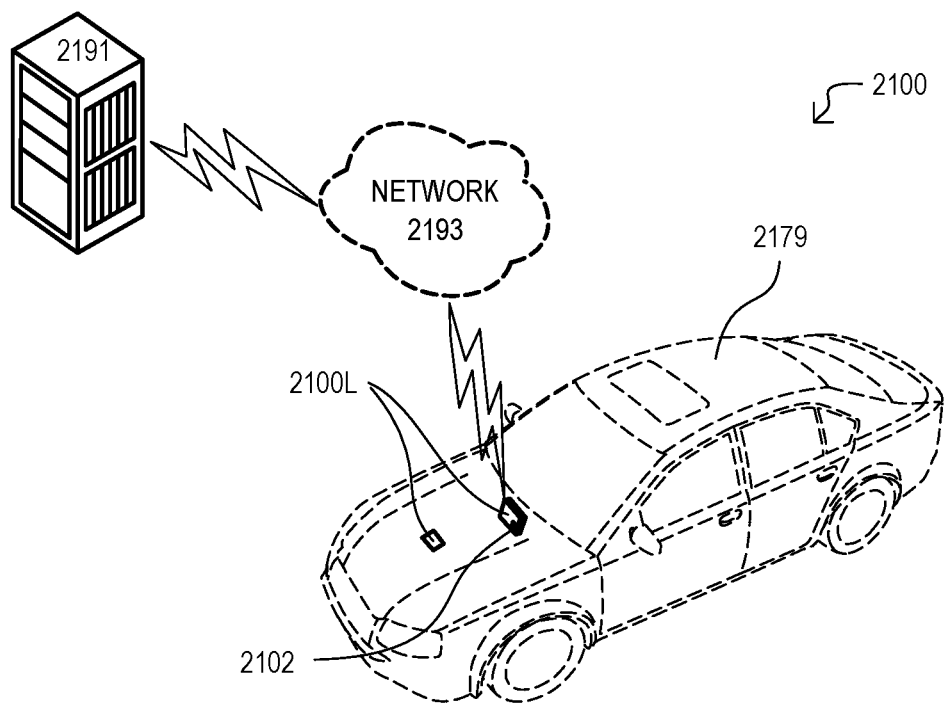
FIG. 21 is diagram of an automotive related system according to an embodiment.

Embodiments can include any suitable system, including portable electronic devices. However, embodiments can also include larger systems. FIG. 21 is diagram of a system 2100 according to one embodiment. A system 2100 can include an automobile 2179 with a local system 2100L. A local system 2100L can be all or part of an automobile control system and can include a secure nonvolatile memory device 2102 according to embodiments disclosed herein, or an equivalent. Local system 2100L can be communication with a server 2191 through a wireless network 2193.

In some embodiments, a server 2191 can have one or more keys that enable access to one or more regions of memory device 2102. A server 2191 can be capable of FW and/or HW authentication of the memory device 2102 according to embodiments herein or an equivalent. Further, the memory device 2102 itself can be capable of authenticating communications from the server 2191.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention,

What is claimed is:

1. A device, comprising:
a plurality of regions, each region including a plurality of nonvolatile memory cells;
a permission store configured to store a set of permission values, including at least one permission value for each region in a nonvolatile fashion;
access control circuits configured to control access to each region according to the permission value for the region, including one or more of
requiring authentication to access the region,
encrypting data read from the region, and
decrypting data for storage in the region;
at least one nonvolatile monotonic counter (NMC) configured to generate a non-repeating and nonvolatile count value, wherein the access control circuits include authentication circuits configured to authenticate received data with the count value of at least one NMC and generate authentication values for transmission with the count value of at least one NMC.

2. The device of claim 1, wherein each region comprises a NOR type flash array.

3. The device of claim 1, further including:
a nonvolatile key store configured to store a plurality of region keys for each region; and
the access control circuits are configured to
authenticate received data directed to a region with a key for that region,
generate message authentication codes (MACs) with a key for a region for responses to accesses to the region,
decrypt received data addressed to a region with a region key for that region, and
encrypt data read from a region with a region key for that region.

4. The device of claim 3, wherein the permission store includes a plurality of nonvolatile index values for each region, each index value being programmable to point to one of the region keys.

5. The device of claim 3, further including a deprecator module configured to limit reuse of a region key.

6. The device of claim 1, wherein the permission store includes a manufacturer store configured to selectively store an access key for each region according to a customer, each access key enabling access to a corresponding region by a device manufacturer.

7. A method, comprising:
receiving a request at a memory device, the memory device having a plurality of regions, each region separately configurable for different kinds of access permissions;
by operation of the memory device, determining a region targeted for an operation from information in the request;
providing an access store having a separate key value for each region, and
from some access permissions, conditioning access to the targeted region based on the key value for the targeted region; wherein
the key values for regions are stored in a nonvolatile key store.

8. The method of claim 7, wherein conditioning access to the targeted includes authenticating the received request with an authentication process that includes the key value for the targeted region.

9. The method of claim 8, further including:
generating a nonvolatile monotonic count value; and
the authentication process includes the key value and the monotonic count value.

10. The method of claim 7, wherein conditioning access to the targeted includes decrypting the request with a decryption process that includes the key value for the targeted region.

11. The method of claim 7, wherein the access permissions for each region include:
reads and writes are allowed without restriction;
read operations that require authentication with a key exclusive to the targeted region;
program and erase operations that require authentication with a key exclusive to the targeted region;
read operations that require encryption with a key exclusive to the targeted region; and
program and erase operations that require decryption with a key exclusive to the targeted region.

12. The method of claim 7, further including:
the memory device includes a plurality of nonvolatile key value storage locations exclusive to each region; and
selecting the key value for the targeted region includes selecting the key value from the plurality of nonvolatile key value storage locations exclusive to the targeted region.

13. The method of claim 12, wherein:
the memory device includes a plurality of nonvolatile index values exclusive to each region, each index value pointing to a nonvolatile key storage location; and
selecting the key value for the targeted region includes selecting an index value for the targeted region to access the key value pointed to by the selected index value; wherein the index values are accessed with a nonvolatile deprecating value that prevents the same index value from being used more than once.

14. A system, comprising:
at least a host device configured to transmit access requests that identify one of a plurality of regions in a memory device;
the memory device coupled to the host device by a communication bus and including
at least two regions, each region including nonvolatile memory cells,
a nonvolatile key store configured to store a plurality of key values exclusive to each region, and
an access control circuit configured to selectively enable access to each region by the host device based on a key for the region.

15. The system of claim 14, wherein the access control circuit includes an authentication circuit configured to authenticate requests based on a key value for the region identified by the request.

16. The system of claim 14, wherein the access control circuit includes an encryption circuit configured to
decrypt data received in a request based on a key value for the region identified by the request, and
encrypt data from the region identified by the request based on key value for the region.

17. The system of claim 14, wherein:
in a mutual authentication operation
the host device is configured to
send a challenge value to the memory device with a request message authentication code (MAC),
authenticate the memory device with a master key in response to receiving a response MAC from the memory device
authenticate firmware on the memory device in response to decrypting an encrypted challenge value received from the memory device with a secret boot value; and
the memory device is configured to
authenticate the host device with a master key in response to receiving the request MAC from the host device,
encrypt the challenge value with the secret boot value,
send the encrypted challenge value to the host device with the response MAC.

18. The system of claim 14, further including at least a second device configured to access at least one region with a key for that region, wherein the key is not stored by the first device.

19. The system of claim 14, further including the host device includes a plurality of processing elements, and a first processing element has access to a key for a first region and the second processing element has access to a key for a second region and cannot access the first region.

* * * * *